United States Patent
Taniguchi et al.

(10) Patent No.: US 11,414,508 B2
(45) Date of Patent: Aug. 16, 2022

(54) RESIN COMPOSITION WITH A (METH)ACRYLIC COPOLYMER, ANTIFOULING PAINT COMPOSITION, AND METHOD FOR PRODUCING SAME

(71) Applicant: Mitsubishi Chemical Corporation, Chiyoda-ku (JP)

(72) Inventors: Kana Taniguchi, Tokyo (JP); Junichi Nakamura, Tokyo (JP); Sho Katsumata, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/582,074

(22) Filed: Sep. 25, 2019

(65) Prior Publication Data

US 2020/0017617 A1    Jan. 16, 2020

Related U.S. Application Data

(63) Continuation of application No. PCT/JP2018/012652, filed on Mar. 28, 2018.

(30) Foreign Application Priority Data

Mar. 29, 2017 (JP) ................. JP2017-066013

(51) Int. Cl.
   *C08F 220/18* (2006.01)
   *C08F 220/06* (2006.01)
   *C08G 77/18* (2006.01)
   *C09D 133/10* (2006.01)
   *C09D 5/16* (2006.01)

(52) U.S. Cl.
   CPC .......... *C08F 220/18* (2013.01); *C08F 220/06* (2013.01); *C08G 77/18* (2013.01); *C09D 5/1637* (2013.01); *C09D 5/1662* (2013.01); *C09D 133/10* (2013.01)

(58) Field of Classification Search
   CPC .... C08F 220/18; C08F 220/06; C09D 5/1662; C09D 133/10; C09D 5/1637; C08G 77/18
   See application file for complete search history.

(56) References Cited

U.S. PATENT DOCUMENTS

| | | | |
|---|---|---|---|
| 4,659,781 | A | 4/1987 | Okude et al. |
| 5,053,461 | A | 10/1991 | Tone et al. |
| 5,436,284 | A | 7/1995 | Honda et al. |
| 5,548,018 | A | 8/1996 | Maekawa |
| 5,936,026 | A | 8/1999 | Huybrechts et al. |
| 6,110,990 | A | 8/2000 | Nakamura et al. |
| 6,172,132 | B1 | 1/2001 | Nakamura et al. |
| 6,201,040 | B1 | 3/2001 | Kitajima et al. |
| 6,458,878 | B1 | 10/2002 | Tsuboi et al. |
| 2003/0207962 | A1 | 11/2003 | Oya et al. |
| 2006/0258772 | A1 | 11/2006 | Sugihara et al. |
| 2011/0123478 | A1 | 5/2011 | Dahling |
| 2012/0202076 | A1 | 8/2012 | Ehara et al. |
| 2012/0294825 | A1* | 11/2012 | Ehara ................... C09D 5/1675 424/78.09 |
| 2013/0058889 | A1 | 3/2013 | Iwamoto et al. |
| 2013/0136818 | A1 | 5/2013 | Uehara et al. |
| 2014/0315030 | A1 | 10/2014 | Niimoto et al. |
| 2015/0118454 | A1 | 4/2015 | Kwon et al. |
| 2016/0282516 | A1* | 9/2016 | Imafuku ............. C05F 290/068 |
| 2018/0051179 | A1 | 2/2018 | Katsumata et al. |
| 2019/0352514 | A1 | 11/2019 | Katsumata et al. |

FOREIGN PATENT DOCUMENTS

| | | |
|---|---|---|
| CN | 1174860 A | 3/1998 |
| CN | 1442461 A | 9/2003 |
| CN | 102083925 A | 6/2011 |
| CN | 102821872 A | 12/2012 |
| CN | 104053690 A | 9/2014 |
| CN | 104334659 A | 2/2015 |
| CN | 108137751 A | 6/2018 |
| EP | 0 821 034 A2 | 1/1998 |
| EP | 3 075 753 A1 | 10/2016 |
| EP | 6-056751 B * | 1/2017 |
| EP | 3 354 667 A1 | 8/2018 |
| JP | 1-103671 | 4/1989 |
| JP | 2-67303 | 3/1990 |
| JP | 04-103671 A | 4/1992 |
| JP | 07-102193 A | 4/1995 |
| JP | 08-269388 A | 10/1996 |

(Continued)

OTHER PUBLICATIONS

Extended European Search Report dated Mar. 2, 2020 in European Patent Application No. 18776410.5, 10 pages.
International Search Report dated Jul. 3, 2018 in PCT/JP2018/012652 filed Mar. 28, 2018 (with English Translation).
Office Action dated Jul. 22, 2020 in corresponding Korean Patent Application No. 10-2019-7027421 (with English Translation), 15 pages.
Requirement for Restriction Election dated Sep. 3, 2019 in U.S. Appl. No. 15/922,339.
European Office Action dated Mar. 6, 2020 in Patent Application No. 16 648 710.6, citing document AA, 6 pages.
Extended European Search Report dated Oct. 31, 2019, in Patent Application No. 191912088, citing documents AB and AC, 8 pages.
Combined Chinese Office Action and Search Report dated Nov. 11, 2019, in Patent Application 201680055192.3 (with unedited computer generated English translation), citing documents AJ-AL, 34 pages.

(Continued)

*Primary Examiner* — Robert D Harlan
(74) *Attorney, Agent, or Firm* — Oblon, McClelland, Maier & Neustadt, L.L.P.

(57) ABSTRACT

A (meth)acrylic copolymer of the present invention includes at least one constituent unit (A) selected from the group consisting of a constituent unit (A1) having at least one structure (I) represented by Formula (1), Formula (2), or Formula (3), a constituent unit (A2) containing a triorganosilyloxycarbonyl group, and a constituent unit (A3) having at least one structure (III) represented by Formula (4) or Formula (5), a constituent unit (B) derived from a specific polysiloxane block-containing polymerizable monomer (b), and a constituent unit (C) derived from a macromonomer (c).

23 Claims, No Drawings

(56) References Cited

FOREIGN PATENT DOCUMENTS

| | | | |
|---|---|---|---|
| JP | 08-269389 A | | 10/1996 |
| JP | 10-95816 | | 4/1998 |
| JP | 11-116857 A | | 4/1999 |
| JP | 2000-063708 A | | 2/2000 |
| JP | 2000-248029 A | | 9/2000 |
| JP | 2001-323208 A | * | 11/2001 |
| JP | 2002-12630 | | 1/2002 |
| JP | 2003-277680 A | | 10/2003 |
| JP | 2004-300410 A | | 10/2004 |
| JP | 2005-146217 A | | 6/2005 |
| JP | 2006-77095 | | 3/2006 |
| JP | 2011-26357 A | | 2/2011 |
| JP | 2011-523969 A | | 8/2011 |
| JP | 2012-005934 A | | 1/2012 |
| JP | 2014-031418 A | | 2/2014 |
| JP | 5506672 | | 5/2014 |
| JP | 6-056751 B | * | 1/2017 |
| JP | 6056751 B2 | | 1/2017 |
| JP | 2018-062555 A | | 4/2018 |
| KR | 10-2012-0096112 A | | 8/2012 |
| TW | 201341410 A | | 10/2013 |
| TW | 201502172 A | | 1/2015 |
| TW | 201700648 A | | 1/2017 |
| WO | WO 2011/046087 A1 | | 4/2011 |
| WO | WO 2011/162129 A1 | | 12/2011 |
| WO | 2012/018043 A1 | | 2/2012 |
| WO | 2013/073580 | | 5/2013 |
| WO | WO 2013/108880 | | 7/2013 |
| WO | WO 2013/108880 A1 | | 7/2013 |
| WO | WO 2016/167360 A1 | | 10/2016 |
| WO | WO 2017/051922 A1 | | 3/2017 |
| WO | WO 2017/065172 A1 | | 4/2017 |

OTHER PUBLICATIONS

Office Action dated Feb. 9, 2021, in Japanese Patent Application No. 2020-036268 (with English language translation), citing document AN.
Google Patents Translation of JP 2003-277680 (2003, 7 pages).
Japanese Office Action dated Dec. 3, 2019, in Patent Application No. 2018-128600 (with English translation), citing documents AP and AQ.
Google patents translation of JP 2014031418 (2014, 9 pages).
Extended European Search Report dated Jul. 16, 2018, Patent Application No. 16848710.6, citing documents AD and AE, 10 pages.
Office Action dated Jan. 8, 2021, in Chinese Patent Application No. 2016800551923 (with English language translation).
Office Action dated Feb. 9, 2021, in Japanese Patent Application No. 2020-036071 (with English language translation).
Japanese Office Action dated Dec. 3, 2019 in Patent Application No. 2018-128599 (with English translation), 6 pages.
Human translation of JP 04103671 (1992, 31 pages).
Office Action dated Apr. 23, 2019, in Japanese Patent Application No. 2018-128599 (with English translation, citing document AI, 9 pages.
Office Action dated Apr. 23, 2019, in Japanese Patent Application No. 2018-128600 (with English translation), citing document AI, 9 pages.
European Office Action dated Apr. 4, 2019, in Patent Application No. 16 848 710.6, 7 pages.
Office Action dated Jan. 28, 2019, in Korean Application No. 10-2018-7007735 (with unedited computer generated English translation).
International Search Report dated Dec. 20, 2016 in PCT/JP2016/078242 filed on Sep. 26, 2016 (with English translation).
Taiwanese Office Action dated Mar. 16, 2017 in Taiwanese Patent Application No. 105131022 (with English translation).
Office Action dated Jan. 31, 2020, in U.S. Appl. No. 15/922,339.
Office Action dated Aug. 28, 2020, in U.S. Appl. No. 15/922,339.
Office Action dated May 5, 2021 in U.S. Appl. No. 15/922,339.
Office Action dated Jan. 6, 2021 in U.S. Appl. No. 15/922,339.
European Search Report dated Jul. 27, 2021, in European Patent Application No. 21157324.1.
Office Action dated Aug. 18, 2021, in Chinese Patent Appiication No. 201880021086.2 filed Mar. 28, 2018, citing documents AO-AP.
Office Action dated Aug. 24, 2021, in Japanese Patent Application No. 2019-509947 filed Mar. 28, 2018 (with machine generated English translation), citing document AQ.
Office Action dated Aug. 27, 2021, in Chinese Patent Application No. 20168055192.3.
Japanese Office Action dated Sep. 7, 2021, in Japanese Patent Application No. 2020-036071 (with English Translation).
Japanese Office Action dated Sep. 7, 2021, in Japanese Patent Application No. 2020-036268 (with English Translation).
Office Action dated Aug. 17, 2021, in Taiwanese Patent Application No. 107110594 filed Mar. 28, 2018 (with English translation), citing documents AO-AR.

* cited by examiner

RESIN COMPOSITION WITH A (METH)ACRYLIC COPOLYMER, ANTIFOULING PAINT COMPOSITION, AND METHOD FOR PRODUCING SAME

This application is a continuation application of International Application No. PCT/JP2018/012652, filed on Mar. 28, 2018, which claims the benefit of priority of the prior Japanese Patent Application No. 2017-066013, filed on Mar. 29, 2017, the content of which is incorporated herein by reference.

TECHNICAL FIELD

The present invention relates to a (meth)acrylic copolymer, a method for producing the same, a resin composition, and an antifouling paint composition.

BACKGROUND ART

It is known that marine structures or ships are coated with antifouling paints for the purpose of preventing adhesion of marine organisms that cause corrosion of a portion in contact with sea water or a decrease in sailing speed. In the related art, self-polishing antifouling paints are known as antifouling paints.

A self-polishing antifouling paint typically contains a hydrolyzable resin and an antifouling agent. In a case of a coating film obtained from such an antifouling paint, the surface of the coating film is gradually dissolved in sea water to renew the surface (self-polished), and the surface of the coating film is constantly exposed to an antifouling agent. Therefore, an antifouling effect is exhibited for a long period of time.

An antifouling paint obtained by using a composition for an antifouling paint which contains an organic solvent and a vinyl polymer containing a hemiacetal ester group and/or a hemiketal ester group in a side chain has been suggested as the self-polishing antifouling paint (PTL 1). The vinyl polymer has hydrolyzability, and a coating film containing the vinyl polymer exhibits a self-polishing property. Such a composition is blended with an antifouling agent or the like and used as an antifouling paint.

As other self-polishing antifouling paints, for example, a paint composition which contains a copolymer having a constituent unit derived from a silicon-containing polymerizable monomer and a constituent unit derived from a metal atom-containing polymerizable monomer having divalent metal atoms (PTL 2), an antifouling paint composition which contains a hydrolyzable resin containing a silicon-containing group and a triorganosilyloxycarbonyl group (PTL 3), and the like have been suggested. A coating film obtained by using such an antifouling paint composition exhibits a self-polishing property, and the surface energy thereof is decreased due to a silicon structure of the coating film. Therefore, the coating film exhibits an antifouling effect even in a case where the coating film does not contain an antifouling agent.

Further, in recent years, reduction of a volatile organic compound (hereinafter, also referred to as a "VOC") becomes important due to the impact on the environment or the like, and reduction of a VOC has also been examined for an antifouling paint.

CITATION LIST

Patent Literature

[PTL 1] Japanese Unexamined Patent Application, First Publication No. H04-103671

[PTL 2] Japanese Unexamined Patent Application, First Publication No. 2004-300410

[PTL 3] PCT International Publication No. 2011/046087

DISCLOSURE OF INVENTION

Technical Problem

Since the composition for an antifouling paint in PTL 1 contains a large amount of an organic solvent, an antifouling paint obtained by using this antifouling paint composition has a high VOC content. The VOC content decreases in a case of a decrease in the content of the organic solvent, but the viscosity increases due to an increase in solid content, and thus it becomes difficult to prepare or apply the antifouling paint. Further, it is necessary to lower the molecular weight or the glass transition temperature (Tg) in a case where the viscosity of this composition for an antifouling paint is intended to be decreased. In this case, there is a problem in that the block resistance deteriorates because the hardness of the coating film becomes insufficient. Specifically, in a case where a ship or the like after being coated is temporarily placed on a block, a portion where the block is in contact with the coating film may be damaged or the periphery of the portion may rise. That is, defects may easily occur in the coating film. The paint compositions listed in PTLs 2 to 3 have the same problems.

An object of the present invention is to provide a (meth)acrylic copolymer which enables formation of an organic solvent solution with a high solid content and a low viscosity and formation of a coating film with an excellent hardness, a resin composition and an antifouling paint composition obtained by using the (meth)acrylic copolymer, and a method for producing the (meth)acrylic copolymer.

Solution to Problem

The present invention has the following aspects.

[1] A (meth)acrylic copolymer, including: at least one constituent unit (A) selected from the group consisting of a constituent unit (A1) having at least one structure (I) represented by Formula (1), Formula (2), or Formula (3), a constituent unit (A2) containing a triorganosilyloxycarbonyl group, and a constituent unit (A3) having at least one structure (III) represented by Formula (4) or Formula (5), a constituent unit (B) derived from at least one polysiloxane block-containing polymerizable monomer (b) selected from the group consisting of a polymerizable monomer represented by Formula (b1), a polymerizable monomer represented by Formula (b2), a polymerizable monomer represented by Formula (b3), and a polymerizable monomer represented by formula (b4), and a constituent unit (C) derived from a macromonomer (c).

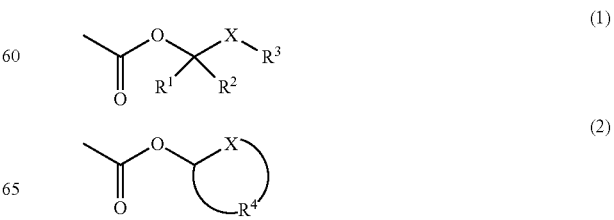

-continued

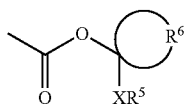  (3)

—COO-M-OCO— (4)

—COO-M-R$^{22}$ (5)

CH$_2$=CR$^{3a}$—CO—O—(C$_u$H$_{2u}$—O)$_v$—C$_w$H$_{2w}$—(SiR$^{3b}$R$^{3c}$—O)$_x$—SiR$^{3d}$R$^{3e}$R$^{3f}$ (b1)

CH$_2$=CR$^{4a}$—CO—O—(C$_u$'H$_{2u}$'—O)$_{v'}$—C$_w$'H$_{2w'}$—Si(OSiR$^{4b}$R$^{4c}$R$_{4d}$) (b2)

CH$_2$=CR$^{2a}$—CO—O—(C$_k$'H$_{2k}$'—O)$_{l'}$—C$_m$'H$_{2m'}$—Si((OSiR$^{2b}$R$^{2c}$)$_r$,—OSiR$^{2d}$R$^{2e}$R$^{2f}$)$_2$—OSi((OSiR$^{2g}$R$^{2h}$)$_s$,—OSiR$^{2i}$R$^{2j}$R$^{2k}$)$_2$—C$_o$'H$_{2o}$'—(O—C$_p$'H$_{2p}$')$_{q'}$—O—CO—CR$^{21}$=CH$_2$ (b3)

CH$_2$=CR$^{1a}$—CO—O—(C$_k$H$_{2k}$—O)$_l$—C$_m$H$_{2m}$—(SiR$^{1b}$R$^{1c}$—O)$_n$—SiR$^{1d}$R$^{1e}$—C$_o$H$_{2o}$—(O—CH$_p$H$_{2p}$)$_q$—O—CO—CR$^{1f}$=CH$_2$ (b4)

(in Formulae (1) to (5) and (b1) to (b4), X represents —O—, —S—, or —NR$^{14}$—, R$^{14}$ represents a hydrogen atom or an alkyl group, R$^1$ and R$^2$ each represents a hydrogen atom or an alkyl group having 1 to 10 carbon atoms, R$^3$ and R$^5$ each represents an alkyl group having 1 to 20 carbon atoms, a cycloalkyl group, or an aryl group, R$^4$ and R$^6$ each represents an alkylene group having 1 to 10 carbon atoms, M represents Zn, Cu, Mg, or Ca, R$^{22}$ represents a monovalent organic acid residue, R$^{3a}$ represents a hydrogen atom or a methyl group, u represents an integer of 2 to 5, v represents a number of 0 to 50, w represents an integer of 2 to 5, x represents a number of 3 to 80, R$^{ab}$ to R$^{3f}$ each represents an alkyl group, an alkoxy group, a phenyl group, a substituted phenyl group, a phenoxy group, or a substituted phenoxy group, R$^{4a}$ represents a hydrogen atom or a methyl group, u' represents an integer of 2 to 5, v' represents an integer of 0 to 50, w' represents an integer of 2 to 5, R$^{4b}$ to R$^{4d}$ each represents an alkyl group, —(OSiR$^{51}$R$^{52}$)$_y$—OSiR$^{53}$R$^{54}$R$^{55}$ (here, y represents an integer of 0 to 20, and R$^{51}$ to R$^{55}$ represent an alkyl group), —R$^{56}$—(OC$_2$H$_4$)$_{y'}$—OR$^{57}$ (here, y' represents an integer of 1 to 20, R$^{56}$ represents an alkylene group, and R$^{57}$ represents an alkyl group), R$^{2a}$ and R$^{2l}$ each represents a hydrogen atom or a methyl group, k' and p' each represents an integer of 2 to 5, l' and q' each represents a number of 0 to 50, m' and o' each represents an integer of 2 to 5, r and s each represents a number of 0 to 20, R$^{2b}$ to R$^{2k}$ each represents an alkyl group, R$^{1a}$ and R$^{1f}$ each represents a hydrogen atom or a methyl group, k and p each represents an integer of 2 to 5, l and q each represents a number of 0 to 50, m and o each represents an integer of 2 to 5, n represents a number of 3 to 80, and R$^{1b}$ to R$^{1e}$ each represents an alkyl group, an alkoxy group, a phenyl group, a substituted phenyl group, a phenoxy group, or a substituted phenoxy group)

[2] The (meth)acrylic copolymer according to [1], in which the macromonomer (c) has two or more constituent units represented by Formula (c').

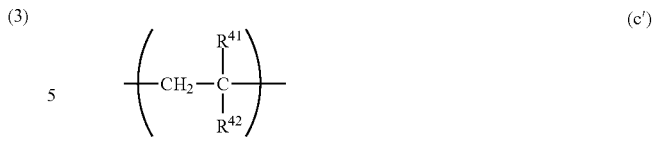  (c')

(in Formula (c'), R$^{41}$ (represents a hydrogen atom, a methyl group, or CH$_2$OH, R$^{42}$ represents OR$^{43}$, a halogen atom, COR$^{44}$, COOR$^{45}$, CN, CONR$^{46}$R$^{47}$, or R$^{48}$, R$^{43}$ to R$^{47}$ each independently represents a hydrogen atom, an alkyl group having an unsubstituted or substituted group, an alicyclic group having an unsubstituted or substituted group, an aryl group having an unsubstituted or substituted group, a heteroaryl group having an unsubstituted or substituted group, a non-aromatic heterocyclic group having an unsubstituted or substituted group, an aralkyl group having an unsubstituted or substituted group, an alkaryl group having an unsubstituted or substituted group, or an organosilyl group having an unsubstituted or substituted group, and R$^{48}$ represents an aryl group having an unsubstituted or substituted group or a heteroaryl group having an unsubstituted or substituted group)

[3] The (meth)acrylic copolymer according to [1] or [2], in which a number-average molecular weight of the macromonomer (c) is in a range of 500 to 50000.

[4] A method for producing a (meth)acrylic copolymer, including: a step of polymerizing a monomer mixture which contains at least one polymerizable monomer (a) selected from the group consisting of a polymerizable monomer (a1) having at least one structure (I), a polymerizable monomer (a2) containing a triorganosilyloxycarbonyl group, and a polymerizable monomer (a3) having at least one structure (III), the polysiloxane block-containing polymerizable monomer (b), and a macromonomer (c) to obtain a (meth) acrylic copolymer.

[5] A resin composition, including: the (meth)acrylic copolymer according to any one of [1] to [3].

[6] The resin composition according to [5], further including: silicone oil.

[7] The resin composition according to [5] or [6], further including: an organic solvent.

[8] The resin composition according to any one of [5] to [7], in which the (meth)acrylic copolymer has the constituent unit (A1), and the resin composition further contains at least one compound (Y) selected from the group consisting of a compound represented by Formula (31), a compound represented by Formula (32), and a compound represented by Formula (33).

  (31)

  (32)

  (33)

(in Formulae (31) to (33), X represents —O—, —S—, or —NR$^{14}$—, R$^{14}$ represents a hydrogen atom or an alkyl group, R$^7$ represents a hydrogen atom or an alkyl group having 1 to 9 carbon atoms, R$^8$ represents a hydrogen atom or an alkyl group having 1 to 10 carbon atoms, R$^9$ and R$^{11}$ each represents an alkyl group having 1 to 20 carbon atoms, a cycloalkyl group, or an aryl group, R$^{10}$ represents a single bond or an alkylene group having 1 to 9 carbon atoms, and R$^{12}$ represents an alkylene group having 1 to 9 carbon atoms)

[9] An antifouling paint composition, including: the resin composition according to any one of [5] to [8].

[10] The antifouling paint composition according to [9], further including: an antifouling agent.

[11] The antifouling paint composition according to [9] or [10], further including: a thermoplastic resin other than the (meth)acrylic copolymer.

Advantageous Effects of Invention

According to the present invention, it is possible to provide a (meth)acrylic copolymer which enables formation of an organic solvent solution with a high solid content and a low viscosity and formation of a coating film with an excellent hardness, a resin composition and an antifouling paint composition obtained by using the (meth)acrylic copolymer, and a method for producing the (meth)acrylic copolymer.

BEST MODE FOR CARRYING OUT THE INVENTION

The definitions of the following terms apply throughout the present specification and claims.

The term "constituent unit" indicates a constituent unit derived from a polymerizable monomer formed by polymerizing a polymerizable monomer or a constituent unit obtained by treating a polymer so that a part of a constituent unit is converted to another structure.

The term "(meth)acrylate" is a general term for acrylate and methacrylate, the term "(meth)acrylic acid" is a general term for acrylic acid and methacrylic acid, the term "(meth)acryloyl group" is a general term for an acryloyl group and a methacryloyl group, and the term "(meth)acrylamide" is a general term for acrylamide and methacrylamide.

The term "(meth)acrylic copolymer" indicates a copolymer in which at least some constituent units are constituent units derived from a (meth)acrylic monomer. The (meth)acrylic copolymer may further have a constituent unit derived from a monomer other than a (meth)acrylic monomer (for example, a vinyl-based monomer such as styrene).

The term "(meth)acrylic monomer" indicates a monomer containing an acryloyl group or a methacryloyl group.

The term "volatile organic compound (VOC)" indicates an organic compound (volatile organic compound) which easily volatilizes at room temperature under normal pressure. Further, room temperature indicates a temperature range of 10° C. to 30° C. and normal pressure indicates a pressure range of 1000 Pa to 1050 Pa.

[(Meth)Acrylic Copolymer]

The (meth)acrylic copolymer (hereinafter, also referred to as a "copolymer (X)") of the present invention has the following constituent unit (A), constituent unit (B), and constituent unit (C).

The copolymer (X) may further have a constituent unit (hereinafter, also referred to as a "constituent unit (D)") other than the constituent unit (A), the constituent unit (B), and the constituent unit (C).

Some constituent units of the copolymer (X) are constituent units derived from a (meth)acrylic monomer. The proportion of the constituent units derived from a (meth)acrylic monomer with respect to the total amount (100% by mass) of all constituent units in the copolymer (X) is preferably in a range of 20% to 100% by mass and more preferably in a range of 40% to 100% by mass.

<Constituent Unit (A)>

The constituent unit (A) is at least one constituent unit selected from the group consisting of a constituent unit (A1), a constituent unit (A2), and a constituent unit (A3).

The constituent unit (A1), the constituent unit (A2), and the constituent unit (A3) are common in that these constituent units have a hydrolyzable structure. In a case where the copolymer (X) has the constituent unit (A), the copolymer (X) has hydrolyzability, and a coating film containing the copolymer (X) shows self-polishing properties in water (particularly in sea water). That is, the copolymer (X) has any one or more of a structure (I), a triorganosilyloxycarbonyl group, and a structure (III) and is not dissolved in sea water or the like in this state. However, in a case where this structure is hydrolyzed due to contact with sea water or the like, a carboxy group or the like is generated so that the copolymer (X) can be dissolved in sea water or the like. The surface of the coating film is gradually dissolved in sea water, and thus the surface of the coating film is renewed (self-polished).

(Constituent Unit (A1))

The constituent unit (A1) is a constituent unit having at least one structure (I).

The structure (I) is represented by Formula (1), Formula (2), or Formula (3). In each of the formulae, among single lines extending from carbon atoms of a carbonyl group, the line that is not bonded to an oxygen atom indicates a bonding site.

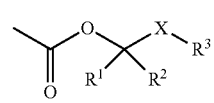

(1)

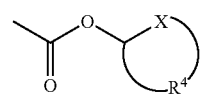

(2)

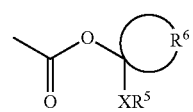

(3)

(In Formulae (1) to (3), X represents —O—, —S—, or —NR$^{14}$—, —R$^{14}$ represents a hydrogen atom or an alkyl group, R$^1$ and R$^2$ each represents a hydrogen atom or an alkyl group having 1 to 10 carbon atoms, R$^3$ and R$^5$ each represents an alkyl group having 1 to 20 carbon atoms, a cycloalkyl group, or an aryl group, and R$^4$ and R$^6$ each represents an alkylene group having 1 to 10 carbon atoms.)

In Formulae (1) to (3), X may represent any of —O— (an etheric oxygen atom), —S— (a sulfide-based sulfur atom), or —NR$^{14}$—, and it is preferable that X represent —O—.

In Formula (1), examples of the alkyl group having 1 to 10 carbon atoms as R$^1$ and R$^2$ include a methyl group, an ethyl group, a propyl group, an isopropyl group, a butyl group, an isobutyl group, a pentyl group, a hexyl group, and a 2-ethylhexyl group.

The number of carbon atoms in the alkyl group as $R^1$ and $R^2$ is preferably in a range of 1 to 4, more preferably in a range of 1 to 3, and still more preferably 1 or 2.

Preferred examples of a combination of $R^1$ and $R^2$ include a combination of a hydrogen atom and a methyl group, a combination of a methyl group and a methyl group, a combination of a hydrogen atom and an alkyl group having 2 to 10 carbon atoms (hereinafter, also referred to as a "long chain alkyl group"), a combination of a methyl group and a long chain alkyl group, a combination of a hydrogen atom and a hydrogen atom, and a combination of a long chain alkyl group and a long chain alkyl group. Among these, from the viewpoint of the hydrolyzability, the combination of a hydrogen atom and a methyl group is preferable.

In Formula (1), examples of the alkyl group having 1 to 20 carbon atoms as $R^3$ include the alkyl groups exemplified as the alkyl group having 1 to 10 carbon atoms above, a decyl group, a dodecyl group, and a tetradecyl group.

The number of carbon atoms in the alkyl group as $R^3$ is preferably in a range of 1 to 10.

As the cycloalkyl group, a cycloalkyl group having 4 to 8 carbon atoms is preferable, and examples thereof include a cyclohexyl group and a cyclopentyl group. As the aryl group, an aryl group having 6 to 20 carbon atoms is preferable, and examples thereof include a phenyl group and a naphthyl group.

It is preferable that $R^3$ represent an alkyl group having 1 to 10 carbon atoms or a cycloalkyl group.

The alkyl group, the cycloalkyl group, or the aryl group may be substituted with a substituent selected from the group consisting of a cycloalkyl group, an aryl group, an alkoxy group, an alkanoyloxy group, an aralkyl group, and an acetoxy group. In a case where the group is substituted with a substituent, the number of substituents may be one or more.

Examples of the cycloalkyl group and the aryl group as a substituent are the same as those described above. Examples of the alkoxy group include a methoxy group, an ethoxy group, a propoxy group, and a butoxy group. Examples of the alkanoyloxy group include an ethanoyloxy group. Examples of the aralkyl group include a benzyl group.

In Formula (2), examples of the alkylene group having 1 to 10 carbon atoms as $R^4$ include a methylene group, an ethylene group, a propylene group, a butylene group, and a hexylene group.

The number of carbon atoms in the alkylene group as $R^4$ is preferably in a range of 2 to 7 and more preferably 3 or 4.

The alkylene group may be substituted with a substituent selected from the group consisting of a cycloalkyl group, an aryl group, an alkoxyl group, an alkanoyloxy group, an aralkyl group, and an acetoxy group. In a case where the group is substituted with a substituent, the number of substituents may be one or more. Specific examples of the substituent which may be substituted with the alkylene group are the same as those exemplified as the substituent as $R^3$.

In Formula (3), $R^5$ has the same definition as that for $R^3$ in Formula (1), and the preferable aspects thereof are the same as described above.

$R^6$ has the same definition as that for $R^4$ in Formula (2), and the preferable aspects thereof are the same as described above.

Examples of the constituent unit (A1) include a constituent unit derived from a polymerizable monomer (a1) having a structure (1). The polymerizable monomer (a1) typically has the structure (I) and an ethylenically unsaturated bond (polymerizable carbon-carbon double bond).

From the viewpoint that the viscosity at the time of dissolving the copolymer (X) in an organic solvent becomes lower, it is preferable that the polymerizable monomer (a1) be a monofunctional monomer having one ethylenically unsaturated bond.

Examples of the polymerizable monomer (a1) include a compound represented by Formula (a11), a compound represented by Formula (a12), and a compound represented by Formula (a13).

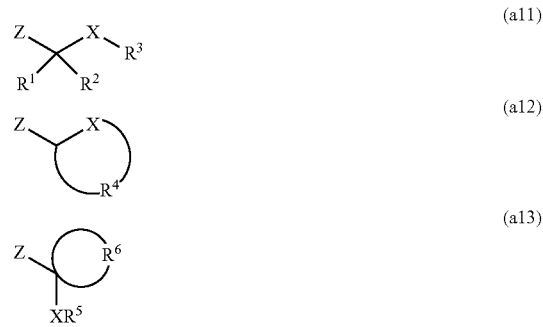

(In Formulae (a11) to (a13), Z represents $CH_2=CH-COO-$, $CH_2=C(CH_3)-COO-$, $CHR^X=CH-COO-$, $CH_2=C(CH_2R^X)-COO-$, or $CH_2=CR^X-CH_2COO-$, $R^X$ represents the structure (I) shown above or an alkyl ester group, X represents $-O-$, $-S-$, or $-NR^{14}-$, $R^{14}$ represents a hydrogen atom or an alkyl group, and $R^1$ to $R^6$ each has the same definition as described above.)

In Formulae (a11) to (a13), $CH_2=CH-COO-$ as Z represents an acryloyloxy group, and $CH_2=C(CH_3)-COO-$ represents a methacryloyloxy group.

$CH(CH_3)=CH-COO-$ represents a crotonoyloxy group (an ethylenically unsaturated bond is of a trans type) or an isocrotonoyloxy group (an ethylenically unsaturated bond is of a cis type).

$CHR^X=CH-COO-$ represents a maleinoyloxy group (an ethylenically unsaturated bond is of a cis type) or a fumaroyloxy group (an ethylenically unsaturated bond is of a trans type), in which a carboxy group is substituted with a structure (I) or an alkyl ester group.

The structure (I) in $R^X$ has the same definition as described above. It is preferable that $R^X$ have the same structure as that of the group to which Z is bonded. For example, in a case of the compound represented by Formula (a11), it is preferable that $R^X$ represent a group represented by $-CR^1R^2-OR^3$.

The alkyl ester group as $R^X$ is represented by $-COOR^{X1}$. $R^{X1}$ represents an alkyl group. As the alkyl group represented by $R^{X1}$, an alkyl group having 1 to 6 carbon atoms is preferable, and a methyl group is particularly preferable.

$CH_2=C(CH_2R^X)-COO-$ or $CH_2=CR^X-CH_2COO-$ represents an itaconoyloxy group in which a carboxy group is substituted with a structure (I) or an alkyl ester group.

$R^X$ has the same definition as described above.

It is preferable that Z represent $CH_2=CH-COO-$ or $CH(CH_3)=CH-COO-$.

Specific examples of the polymerizable monomer (a1) are the same as those described below.

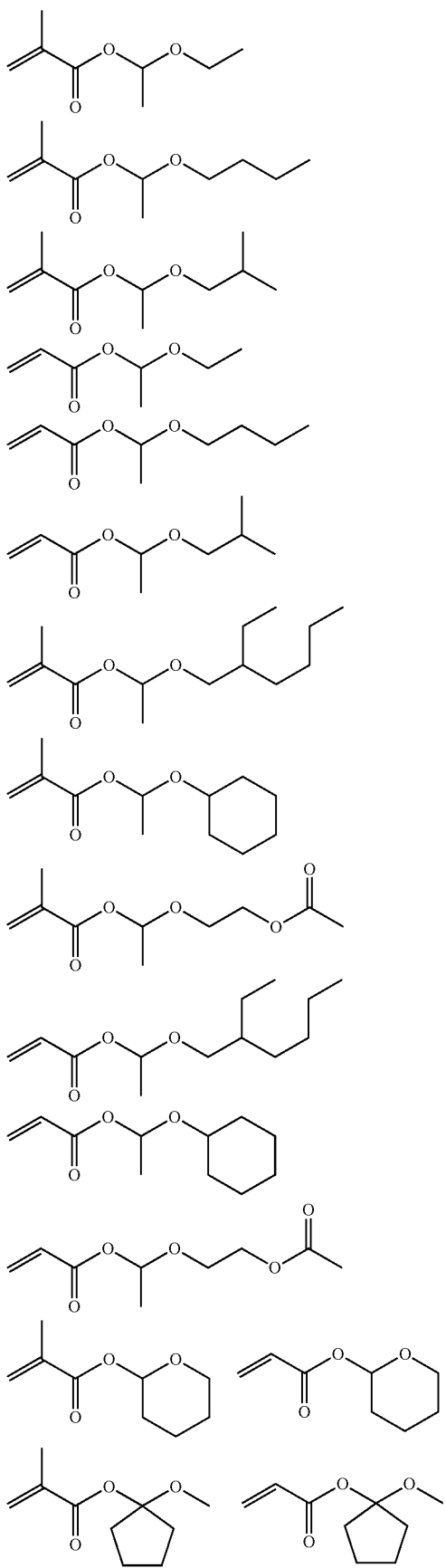

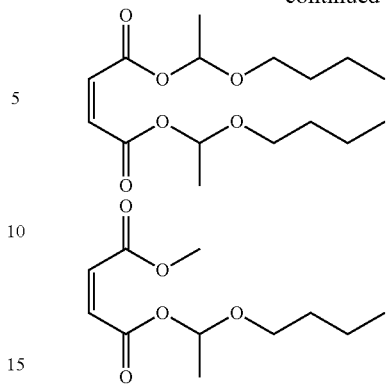

As the polymerizable monomer (a1), a commercially available product may be used or the monomer can be appropriately synthesized according to a known method.

For example, the polymerizable monomer (a1) can be synthesized by converting a carboxy group in a polymerizable monomer (m0) containing the carboxy group to a structure (I).

Examples of the polymerizable monomer (m0) include (meth)acrylic acid, crotonic acid, isocrotonic acid, maleic acid, fumaric acid, itaconic acid, monomethyl maleate, and monomethyl fumarate.

Examples of the method of converting the carboxy group in the polymerizable monomer (m0) to the structure (I) include a method of causing a reaction (addition reaction) between the polymerizable monomer (m0) and at least one compound (Y) selected from the group consisting of a compound represented by Formula (31), a compound represented by Formula (32), and a compound represented by Formula (33). The compound (Y) may be used alone or in combination of two or more kinds thereof.

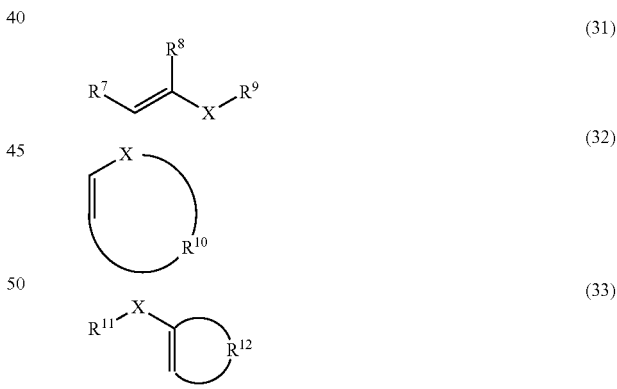

(In Formulae (31) to (33), X represents —O—, —S—, or —NR$^{14}$—, R$^{14}$ represents a hydrogen atom or an alkyl group, R$^7$ represents a hydrogen atom or an alkyl group having 1 to 9 carbon atoms, R$^8$ represents a hydrogen atom or an alkyl group having 1 to 10 carbon atoms, R$^9$ and R$^{11}$ each represents an alkyl group having 1 to 20 carbon atoms, a cycloalkyl group, or an aryl group, R$^{10}$ represents a single bond or an alkylene group having 1 to 9 carbon atoms, and R$^{12}$ represents an alkylene group having 1 to 9 carbon atoms.)

In a case where a compound represented by Formula (31) is used as the compound (Y), a compound in which R$^1$ in Formula (a11) represents CH$_2$R$^7$, R$^2$ represents R$^8$, and R$^3$ represents R$^9$ is obtained as the polymerizable monomer (a1).

In Formula (31), the alkyl group having 1 to 9 carbon atoms as R$^7$ has the same definition as that for the alkyl group having 1 to 10 carbon atoms as R$^1$ except that the number of carbon atoms thereof is 9 or less.

In Formula (31), R$^8$ and R$^9$ each has the same definition as that for R$^2$ and R$^3$ in Formula (a11).

Examples of the compound represented by Formula (31) include 1-alkenyl alkyl ether in which X in Formula (31) represents —O—, 1-alkenyl alkyl sulfide in which X in Formula (31) represents —S—, and 1-alkenyl dialkylamine in which X in Formula (31) represents —NR$^{14}$—. Examples of the 1-alkenyl alkyl ether include vinyl ethers such as alkyl vinyl ether (such as ethyl vinyl ether, butyl vinyl ether, isobutyl vinyl ether, t-butyl vinyl ether, or 2-ethyl hexyl vinyl ether) and cycloalkyl vinyl ether (such as cyclohexyl vinyl ether); 1-propenyl ethers such as ethyl-1-propenyl ether; and 1-butenyl ethers such as ethyl-1-butenyl ether. Examples of the 1-alkenyl alkyl sulfide include 1-alkenyl alkyl sulfides such as 1-(ethenylthio)ethane, 1-(ethenylthio)propane, 1-(ethenylthio)butane, 2-(ethenylthio)butane, 1-(ethenylthio)-2-methylpropane, 1-(propylthio)-1-propene, and 2-(propylthio)-1-propene. Examples of the 1-alkenyl dialkylamine include 1-alkenyl dialkylamines such as N,N-dimethyl ethenamine, N-methyl-N-ethyl ethenamine, N,N-diethyl ethenamine, and N-vinylpyrrolidone.

Among these, 1-alkenyl alkyl ether is preferable, and vinyl ethers and 1-propenyl ethers are more preferable.

In a case where a compound represented by Formula (32) is used as the compound (Y), a compound in which R$^4$ in Formula (a12) represents CH$_2$—R$^{10}$ is obtained as the polymerizable monomer (a1).

In Formula (32), the alkylene group having 1 to 9 carbon atoms as R$^{10}$ has the same definition as that for the alkylene group as R$^4$ except that the number of carbon atoms thereof is 9 or less.

Examples of the compound represented by Formula (32) include dihydrofurans such as 2,3-dihydrofuran, and 5-methyl-2,3-dihydrofuran; dihydropyrans such as 3,4-dihydro-2H-pyran and 5,6-dihydro-4-methoxy-2H-pyran; dihydrothiophenes such as 2,3-dihydrothiophene; dihydrothiopyrans such as 3,4-dihydro-2H-thiopyran; dihydropyrroles such as 2,3-dihydro-1-methylpyrrole; and tetrahydropyridines such as 1,2,3,4-tetrahydro-1-methylpyridine Among these, dihydrofurans and dihydropyrans are preferable, and dihydropyrans are more preferable.

In a case where a compound represented by Formula (33) is used as the compound (Y), a compound in which R$^5$ in Formula (a13) represents R$^{11}$ and R$^6$ represents CH$_2$—R$^{12}$ is obtained as the polymerizable monomer (a1).

In Formula (33), R$^{11}$ has the same definition as that for R$^5$. R$^{12}$ has the same definition as that for R$^6$ except that the carbon atoms thereof is 9 or less.

Examples of the compound represented by Formula (33) include 1-alkoxy-1-cycloalkylenes such as 1-methoxy-1-cyclopentene, 1-methoxy-1-cyclohexene, 1-methoxy-1-cycloheptene, 1-ethoxy-1-cyclopentene, 1-ethoxy-1-cyclohexene, 1-butoxy-1-cyclopentene, and 1-butoxy-1-cyclohexene, substituent-containing 1-alkoxy-1-cycloalkylenes such as 1-ethoxy-3-methyl-1-cyclohexene; 1-(alkylthio)-1-cycloalkylenes such as 1-(methylthio)-1-cyclopentene and 1-(methylthio)-1-cyclohexene; and 1-(1-pyrrolidinyl)-1-cycloalkylenes such as 1-(1-pyrrolidinyl)-1-cyclopentene and 1-(1-pyrrolidinyl)-1-cyclohexene.

As the compound (Y), a commercially available product may be used or the compound can be appropriately synthesized.

The reaction between the polymerizable monomer (m0) and the compound (Y) proceeds under relatively mild conditions.

For example, a target object can be obtained by carrying out the reaction while maintaining the reaction temperature at 40° C. to 100° C. for 5 to 10 hours in the presence or absence of an acidic catalyst such as hydrochloric acid, sulfuric acid, or phosphoric acid.

After completion of the reaction, the target monomer can be recovered by carrying out vacuum distillation under predetermined conditions.

(Constituent Unit (A2))

The constituent unit (A2) is a constituent unit containing a triorganosilyloxycarbonyl group.

Examples of the triorganosilyloxycarbonyl group include a group represented by Formula (II).

(In Formula (II), R$^{14}$ to R$^{16}$ each represents a hydrocarbon group having 1 to 20 carbon atoms.)

In Formula (II), examples of the hydrocarbon group as R$^{14}$ to R$^{16}$ include an alkyl group having 1 to 20 carbon atoms such as a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, a decyl group, an undecyl group, a dodecyl group, a tridecyl group, or a tetradecyl group; a cycloalkyl group such as a cyclohexyl group; and an aryl group such as a phenyl group or a naphthyl group.

Each of the cycloalkyl group and the aryl group may have a substituent. Examples of the substituent include a halogen atom, an alkyl group, an acyl group, a nitro group, and an amino group.

The number of carbon atoms in the alkyl group as a substituent is preferably in a range of 1 to 18.

R$^{14}$ to R$^{16}$ may be the same as or different from one another.

From the viewpoints of obtaining a coating film exhibiting a stabilized polishing rate and maintaining the stabilized antifouling performance for a long period of time, it is preferable that at least one of R$^{14}$ to R$^{16}$ represent an isopropyl group and particularly preferable that all of R$^{14}$ to R$^{16}$ represent an isopropyl group.

Examples of the constituent unit (A2) include a constituent unit derived from the polymerizable monomer (a2) containing a triorganosilyloxycarbonyl group. The polymerizable monomer (a2) typically has a triorganosilyloxycarbonyl group and an ethylenically unsaturated bond (polymerizable carbon-carbon double bond).

From the viewpoint that the viscosity at the time of dissolution of the copolymer (X) in an organic solvent becomes lower, it is preferable that the polymerizable monomer (a2) be a monofunctional monomer having one ethylenically unsaturated bond.

Examples of the polymerizable monomer (a2) include a monomer represented by Formula (a21) and a monomer represented by Formula (a22). Among these, a compound represented by Formula (a21) is preferable.

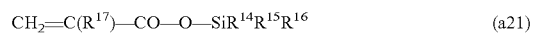

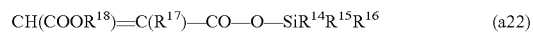

(In Formulae (a21) and (a22), $R^{14}$ to $R^{16}$ each has the same definition as described above, $R^{17}$ represents a hydrogen atom or a methyl group, and $R^{18}$ represents an alkyl group.)

Specific examples of the monomer represented by Formula (a21) include trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (met)acrylate, tri-2-methylisopropylsilyl (meth)acrylate, tri-t-butylsilyl (meth) acrylate, ethyldimethylsilyl (meth)acrylate, n-butyldimethylsilyl (meth)acrylate, diisopropyl-n-butylsilyl (meth)acryl ate, n-octyl di-n-butylsilyl (meth)acrylate, diisopropylstearylsilyl (meth)acrylate, dicyclohexylphenylsilyl (meth)acrylate, t-butyldiphenylsilyl (meth)acrylate, and lauryldiphenylsilyl (meth)acrylate.

In Formula (a22), examples of the alkyl group as $R^{18}$ include an alkyl group having 1 to 5 carbon atoms.

Specific examples of the compound represented by Formula (a22) include triisopropylsilyl methyl fumarate, triisopropylsilyl amyl fumarate, tri-n-butylsilyl-n-butyl malate, t-butyldiphenylsilyl methyl malate, t-butyldiphenylsilyl-n-butyl malate, triisopropylsilyl methyl fumarate, triisopropylsilyl amyl fumarate, tri-n-butylsilyl-n-butyl fumarate, t-butyldiphenylsilyl methyl fumarate, and t-butyldiphenylsilyl-n-butyl fumarate.

As the polymerizable monomer (a2), a commercially available product may be used or the monomer can be appropriately synthesized according to a known method.

(Constituent Unit (A3))

The constituent unit (A3) is a constituent unit having at least one structure (III) represented by Formula (4) or (5).

—COO-M-OCO— (4)

—COO-M-R$^{22}$ (5)

(In Formulae (4) and (5), M represents Zn, Cu, Mg, or Ca, and $R^{22}$ represents a monovalent organic acid residue.)

In Formulae (4) and (5), it is preferable that M represent Zn or Cu.

In Formula (5), the organic acid residue as $R^{22}$ indicates a remaining part obtained by removing one proton from an organic acid (for example, a remaining part obtained by removing a proton from a carboxy group of a carboxylic acid) and is ion-bonded to M in place of this proton.

As the organic acid, a carboxylic acid is preferable, and examples thereof include a monocarboxylic acid such as monochloroacetic acid, monofluoroacetic acid, acetic acid, propionic acid, octylic acid, versatic acid, isostearic acid, palmitic acid, cresotic acid, α-naphthoic acid, β-naphthoic acid, benzoic acid, 2,4,5-trichlorophenoxyaceitc acid, 2,4-dichlorophenoxyacetic acid, quinolinecarboxylic acid, nitrobenzoic acid, nitronaphthalenecarboxylic acid, pyruvic acid, naphthenic acid, abietic acid, hydrogenated abietic acid, or (meth)acrylic acid.

From the viewpoint of the storage stability, it is preferable that $R^{22}$ represent an organic acid residue other than the (meth)acryloyloxy group.

From the viewpoint of obtaining a coating film with high durability which can prevent cracking or peeling for a long period of time, it is preferable that $R^{22}$ represent a fatty acid residue (aliphatic monocarboxylic acid residue) having 1 to 20 carbon atoms.

Examples of the constituent unit (A3) include a constituent unit derived from the polymerizable monomer (a3) having a structure (III).

Examples of the polymerizable monomer (a3) include a monomer in which a vinyl group having an unsubstituted or substituted group is bonded to both terminals of a group represented by Formula (4) and a monomer in which a vinyl group having an unsubstituted or substituted group is bonded to one terminal (a side opposite to the $R^{22}$ side) of a group represented by Formula (5).

Examples of the monomer in which the vinyl group is bonded to both terminals of a group represented by Formula (4) include a monomer (hereinafter, also referred to as a "monomer (a31)") represented by formula (a31).

Examples of the monomer in which the vinyl group is bonded to one terminal of a group represented by Formula (5) include a monomer (hereinafter, also referred to as a "monomer (a32)") represented by Formula (a32).

(CH$_2$=C(R$^{21}$)—CO—O)$_2$M (a31)

CH$_2$=C(R$^{21}$)—CO—O-M-R$^{22}$ (a32)

In Formulae (a31) and (a32), M represents Zn, Cu, Mg, or Ca, $R^{21}$ represents a hydrogen atom or a methyl group, and $R^{22}$ represents a monovalent organic acid residue.

M and $R^{22}$ each has the same definition as described above, and the preferable aspects thereof are the same as described above.

Examples of the monomer (a31) include zinc acrylate [(CH$_2$=CHCOO)$_2$Zn], zinc methacrylate [(CH$_2$=C(CH$_3$)COO)$_2$Zn], copper acrylate [(CH$_2$=CHCOO)$_2$Cu], copper methacrylate [(CH$_2$=C(CH$_3$)COO)$_2$Cu], magnesium acrylate [(CH$_2$=CHCOO)$_2$Mg], magnesium methacrylate [(CH$_2$=C(CH$_3$)COO)$_2$Mg], calcium acrylate [(CH$_2$=CHCOO)$_2$Ca], and calcium methacrylate [(CH$_2$=C(CH$_3$)COO)$_2$Ca]. These may be used alone or in combination of two or more kinds thereof.

Among these, from the viewpoint that the transparency of the copolymer (X) is improved and the color tone of the coating film containing the copolymer (X) tends to be beautiful, zinc (meth)acrylate or copper (meth)acrylate is preferable.

Examples of the monomer (a32) include magnesium monochloroacetate (meth)acrylate, calcium monochloroacetate (meth)acrylate, zinc monochloroacetate (meth)acrylate, and copper monochloroacetate (meth)acrylate; magnesium monofluoroacetate (meth)acrylate, calcium monofluoroacetate (meth)acrylate, zinc monofluoroacetate (meth)acrylate, and copper monofluoroacetate (meth)acrylate; magnesium acetate (meth)acrylate, calcium acetate (meth)acrylate, zinc acetate (meth)acrylate, and copper acetate (meth)acrylate; magnesium propionate (meth)acrylate, calcium propionate (meth)acrylate, zinc propionate (meth)acrylate, and copper propionate (meth)acrylate; magnesium octylate (meth)acrylate, calcium octylate (meth) acrylate, zinc octylate (meth)acrylate, and copper octylate (meth)acrylate; magnesium versatate (meth)acrylate, calcium versatate (meth)acrylate, zinc versatate (meth)acrylate, and copper versatate (meth)acrylate; magnesium isostearate (meth)acrylate, calcium isostearate (meth)acrylate, zinc isostearate (meth)acrylate, and copper isostearate (meth) acrylate; magnesium palmitate (meth)acrylate, calcium palmitate (meth)acrylate, zinc palmitate (meth)acrylate, and copper palmitate (meth)acrylate; magnesium cresotinate (meth)acrylate, calcium cresotinate (meth)acryl ate, zinc cresotinate (meth)acryl ate, and copper cresotinate (meth) acrylate; magnesium α-naphthoate (meth)acrylate, calcium α-naphthoate (meth)acrylate, zinc α-naphthoate (meth)acrylate, and copper α-naphthoate (meth)acrylate; magnesium β-naphthoate (meth)acrylate, calcium β-naphthoate (meth)acrylate, zinc β-naphthoate (meth)acrylate, and copper β-naphthoate (meth)acrylate; magnesium benzoate (meth)acrylate, calcium benzoate (meth)acrylate, zinc benzoate (meth)acrylate, and copper benzoate (meth)acryl ate; magnesium 2,4,5-trichlorophenoxy acetate (meth)acrylate, calcium 2,4,5-trichlorophenoxy acetate (meth)acrylate, zinc 2,4,5-trichlorophenoxy acetate (meth)acrylate, and copper 2,4,5-trichlorophenoxy acetate (meth)acrylate; magnesium 2,4-dichlorophenoxy acetate (meth)acrylate, calcium 2,4-dichlorophenoxy acetate (meth)acryl ate, zinc 2,4-dichlorophenoxy acetate (meth)acrylate, and copper 2,4-dichlorophenoxy acetate (meth)acrylate; magnesium quinoline carboxylate (meth)acrylate, calcium quinoline carboxylate (meth)acrylate, zinc quinoline carboxyl ate (meth)acrylate, and copper quinoline carboxyl ate (meth)acrylate; magnesium nitrobenzoate (meth)acrylate, calcium nitrobenzoate (meth)acrylate, zinc nitrobenzoate (meth)acrylate, and copper nitrobenzoate (meth)acrylate; magnesium nitronaphthalene carboxylate (meth)acrylate, calcium nitronaphthalene carboxylate (meth)acrylate, zinc nitronaphthalene carboxylate (meth)acrylate, and copper nitronaphthalene carboxylate (meth)acrylate; and magnesium pyruvate (meth)acrylate, calcium pyruvate (meth)acrylate, zinc pyruvate (meth)acrylate, and copper pyruvate (meth)acrylate. These may be used alone or in combination of two or more kinds thereof.

Among these, from the viewpoint that the transparency of the copolymer (X) is improved and the color tone of the coating film containing the copolymer (X) tends to be beautiful, a zinc-containing monomer in which M represents Zn is preferable. Further, from the viewpoint of the durability of the coating film to be obtained, fatty acid zinc (meth)acrylate (in which M in Formula (a32) represents Zn and $R^{22}$ represents a fatty acid residue) or fatty acid copper (meth)acrylate (in which M in Formula (a32) represents Cu and $R^{22}$ represents a fatty acid residue) is more preferable.

From the viewpoints of maintaining self-polishing properties of the coating film for a long period of time and obtaining excellent antifouling properties, the polymerizable monomer (a3) may contain both of the monomer (a31) and the monomer (a32). That is, the copolymer (X) may contain both of a constituent unit derived from the monomer (a31) (hereinafter, also referred to as a "monomer (a31) unit") and a constituent unit derived from the monomer (a32) (hereinafter, also referred to as a "monomer (a32) unit").

As the combination of the monomer (a31) and the monomer (a32), a combination of zinc (meth)acryl ate and fatty acid zinc (meth)acryl ate or a combination of copper (meth)acrylate and fatty acid copper (meth)acrylate is preferable.

In a case where the copolymer (X) has both of the monomer (a31) unit and the monomer (a32) unit, the ratio (molar ratio) (monomer (a31) unit/monomer (a32) unit) of the monomer (a31) unit to the monomer (a32) unit in the copolymer (X) is preferably in a range of 10/90 to 90/10, more preferably in a range of 20/80 to 80/20, and still more preferably in a range of 30/70 to 70/30.

In a case where the ratio thereof is 90/10 or less, the crack resistance or the adhesiveness of the coating film becomes excellent. In a case where the ratio thereof is 10/90 or greater, the viscosity of the paint tends to be lowered.

The polymerizable monomer (a3) may be produced according to a known method, or a commercially available product may be used as the monomer.

The monomer (a31) is obtained by reacting an inorganic metal compound having a metal element corresponding to M in Formula (a31) and (meth)acrylic acid in a diluent such as an organic solvent or a reactive diluent containing a polymerizable unsaturated group such as an ethylenically unsaturated monomer. The mixture containing a metal atom-containing polymerizable monomer obtained using this method has excellent compatibility with an organic solvent or another monomer so that the polymerization can be easily carried out. It is preferable that the reaction be performed in the presence of water, and the content of water in the reactant be preferably in a range of 0.01% to 30% by mass. Examples of the inorganic metal compound include an oxide, a hydroxide, and a chloride of a metal selected from Zn, Cu, Mg, and Ca.

The monomer (a32) is obtained by reacting an inorganic metal compound having a metal element corresponding to M in Formula (a32), (meth)acrylic acid, and an organic acid corresponding to $R^{22}$ as an organic acid residue in Formula (a32) in a diluent such as an organic solvent or a reactive diluent containing a polymerizable unsaturated group such as an ethylenically unsaturated monomer. Examples of the inorganic metal compound are the same as those exemplified as the inorganic metal compound used for obtaining the monomer (a31).

The monomer mixture containing the monomer (a31) and the monomer (a32) is obtained by reacting an inorganic metal compound having a metal element corresponding to M in Formulae (a31) and (a32), (meth)acrylic acid, and an organic acid corresponding to $R^{22}$ as an organic acid residue in Formula (a32) in a diluent such as an organic solvent or a reactive diluent containing a polymerizable unsaturated group such as an ethylenically unsaturated monomer.

The amount of the organic acid to be used, which corresponds to $R^{22}$, is preferably in a range of 0.01 to 3 mol times, more preferably in a range of 0.01 to 0.95 mol times, and still more preferably in a range of 0.1 to 0.7 mol times with respect to the amount of the inorganic metal compound. In a case where the content of the organic acid is 0.01 mol times or greater, precipitation of a solid in a step of producing this monomer mixture is suppressed, and the self-polishing properties and crack resistance of a coating film are improved. In a case where the content thereof is 3 mol times or less, the antifouling properties of a coating film tend to be maintained for a long period of time.

<Constituent Unit (B)>

The constituent unit (B) i s a constituent unit derived from a polysiloxane block-containing polymerizable monomer (b) (hereinafter, also referred to as a "polymerizable monomer (b)").

In a case where the copolymer (X) has the constituent unit (B), the coating film containing the copolymer (X) contains a polysiloxane block, and thus marine organisms or various kinds of dirt are unlikely to be attached to the surface of the coating film.

Therefore, the coating film exhibits antifouling properties even in a case where the coating film does not contain an antifouling agent.

The polymerizable monomer (b) is at least one selected from the group consisting of a polymerizable monomer (b1), a polymerizable monomer (b2), a polymerizable monomer (b3), and a polymerizable monomer (b4) described below. Among these, each of the polymerizable monomers (b1) and (b2) is a one terminal type monomer that has an ethylenically unsaturated bond at one terminal of the polysiloxane block, and each of the polymerizable monomers (b3) and (b4) is a terminal type monomer that has an ethylenically unsaturated bond at both terminals of the polysiloxane block.

(Polymerizable Monomer (b1))

The polymerizable monomer (b1) is represented by Formula (b1).

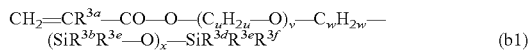
$$CH_2=CR^{3a}-CO-O-(C_uH_{2u}-O)_v-C_wH_{2w}-(SiR^{3b}R^{3e}-O)_x-SiR^{3d}R^{3e}R^{3f} \quad (b1)$$

In Formula (31), $R^{3a}$ represents a hydrogen atom or a methyl group, u represents an integer of 2 to 5, v represents a number of 0 to 50, w represents an integer of 2 to 5, x represents a number of 3 to 80, $R^{3b}$ to $R^{3f}$ each represents an alkyl group, an alkoxy group, a phenyl group, a substituted phenyl group, a phenoxy group, or a substituted phenoxy group.

In Formula (b1), the numbers of carbon atoms of the alkyl group and the alkoxy group as $R^{3b}$ to $R^{3f}$ are preferably in a range of 1 to 18. Examples of the substituent in the substituted phenyl group and the substituted phenoxy group include an alkyl group and an alkoxy group.

$R^{3b}$ to $R^{3f}$ each preferably represents an alkyl group having 1 to 18 carbon atoms, more preferably a methyl group or an ethyl group, and particularly preferably a methyl group.

u represents an integer of 2 to 5 and preferably 2 or 3 from the viewpoint of low cost. A combination of a monomer in which u represents 2 and a monomer in which u represents 3 can be used.

v represents a number of 0 to 50, preferably greater than 0 and 30 or less, more preferably greater than 0 and 25 or less, and particularly preferably greater than 0 and 20 or less. In a case where v is less than or equal to the above-described upper limit, the water resistance of the coating film tends to be improved. It is particularly preferable that v be 20 or less from the viewpoint of excellent recoatability with an old coating film.

w represents an integer of 2 to 5 and preferably 2 or 3.

x represents an average polymerization degree of the polysiloxane structure. In a case where x is greater than or equal to the above-described lower limit, the coating film of the antifouling paint composition tends to exhibit the antifouling effect even in a case where the antifouling paint composition containing the copolymer (X) does not contain an antifouling agent. In a case where x is less than or equal to the above-described upper limit, the compatibility with the polymerizable monomer (b1) and a polymerizable monomer (for example, a polymerizable monomer that forms the constituent unit (A)) that does not contain a polysiloxane block and the solubility of the copolymer (X) in a solvent tend to be improved. x preferably represents 5 to 50, more preferably 7 to 40, and particularly preferably 8 to 30.

Further, each of $R^{3a}$ to $R^{3f}$, u, v, w, and x is independent. In a case where the same symbols are present in or between molecules, these may be different from each other.

Specific examples of the polymerizable monomer (b1) in which v represents 0 include FM-0711, FM-0721, and FM-0725 (all trade names, manufactured by JNC Corporation), and X-24-8201, X-22-174ASX, X-22-174DX, and X-22-2426 (all trade names, manufactured by Shin-Etsu Chemical Co., Ltd.).

(Polymerizable Monomer (b2))

The polymerizable monomer (b2) is represented by Formula (b2).

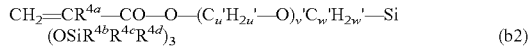
$$CH_2=CR^{4a}-CO-O-(C_{u'}H_{2u'}-O)_{v'}C_{w'}H_{2w'}-Si(OSiR^{4b}R^{4c}R^{4d})_3 \quad (b2)$$

In Formula (b2), $R^{4a}$ represents a hydrogen atom or a methyl group, u' represents an integer of 2 to 5, v' represents an integer of 0 to 50, w' represents an integer of 2 to 5, $R^{4b}$ to $R^{4d}$ each represents an alkyl group, $-(OSiR^{51}R^{52})_y-$ $OSiR^{53}R^{54}R^{55}$ (here, y represents an integer of 0 to 20, and $R^{51}$ to $R^{55}$ represent an alkyl group), or $R^{56}-(OC_2H_4)_{y'}-$ $OR^{57}$ (here, y' represents an integer of 1 to 20, $R^{56}$ represents an alkylene group, and $R^{57}$ represents an alkyl group).

In Formula (b2), the alkyl group as $R^{4b}$ to $R^{4d}$ has the same definition as that for the alkyl group as $R^{3b}$ to $R^{3f}$, and the preferable aspects thereof are the same as described above.

y and y' each represents an average polymerization degree of the polysiloxane structure. In a case where each of y and y' is less than or equal to the above-described upper limit, the compatibility with the polymerizable monomer (b2) and a polymerizable monomer that does not contain a polysiloxane block and the solubility of the copolymer (X) in a solvent tend to be improved. y and y' each preferably represents 10 or less and more preferably 5 or less.

The alkyl group as $R^{51}$ to $R^{55}$ and $R^{57}$ has the same definition as that for the alkyl group as $R^{4b}$ to $R^{4d}$, and the preferable aspects thereof are the same as described above. The number of carbon atoms in the alkylene group as $R^{56}$ is preferably in a range of 1 to 18.

In Formula (b2), u' represents an integer of 2 to 5 and preferably 2 or 3 from the viewpoint of low cost. A combination of a monomer in which u' represents 2 and a monomer in which u' represents 3 can be used.

In Formula (b2), v' has the same definition as that for v in Formula (b1), and the preferable aspects thereof are the same as described above.

w' represents an integer of 2 to 5 and preferably 2 or 3.

Further, each of $R^{4a}$ to $R^{4d}$, u', v', w', y, and y' is independent. In a case where the same symbols are present in or between molecules, these may be different from each other.

Specific examples of the polymerizable monomer (b2) in which v' represents 0 include TM-0701 (trade name, manufactured by JNC Corporation) and X-22-2404 (trade name, manufactured by Shin-Etsu Chemical Co., Ltd.).

(Polymerizable Monomer (b3))

The polymerizable monomer (b3) is represented by Formula (b3).

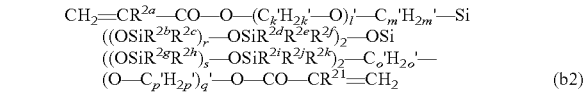
$$CH_2=CR^{2a}-CO-O-(C_{k'}H_{2k'}-O)_{l'}-C_{m'}H_{2m'}-Si((OSiR^{2b}R^{2c})_r-OSiR^{2d}R^{2e}R^{2f})_2-OSi((OSiR^{2g}R^{2h})_s-OSiR^{2i}R^{2j}R^{2k})_2-C_{o'}H_{2o'}-(O-C_{p'}H_{2p'})_{q'}-O-CO-CR^{2l}=CH_2 \quad (b3)$$

In Formula (b3), $R^{2a}$ and $R^{2l}$ each represents a hydrogen atom or a methyl group, k' and p' each represents an integer of 2 to 5, l' and q' each represents a number of 0 to 50, m' and o' each represents an integer of 2 to 5, r and s each represents a number of 0 to 20, and $R^{2b}$ to $R^{2k}$ each represents an alkyl group.

The alkyl group as $R^{2b}$ to $R^{2k}$ has the same definition as that for the alkyl group as $R^{3b}$ to $R^{3f}$, and the preferable aspects thereof are the same as described above.

k' and p' represent an integer of 2 to 5 and preferably 2 or 3 from the viewpoint of low cost. A combination of a monomer in which k' and p' represent 2 and a monomer in which k' and p' represent 3 can be used.

l' and q' each has the same definition as that for v in Formula (b1), and the preferable aspects thereof are the same as described above.

m' and o' represent an integer of 2 to 5 and preferably 2 or 3.

r and s each represents an average polymerization degree of the polysiloxane structure. In a case where each of r and s is lower than or equal to the above-described upper limit, the compatibility with the polymerizable monomer (b3) and a polymerizable monomer that does not contain a polysiloxane block and the solubility of the copolymer (X) in a solvent tend to be improved. r and s each preferably represents 10 or less and more preferably 5 or less.

Further, each of $R^{2a}$ to $R^{2l}$, k', m', n', o', p', q', r, and s is independent. In a case where the same symbols are present in or between molecules, these may be different from each other.

(Polymerizable Monomer (b4))

The polymerizable monomer (b4) is represented by Formula (b4).

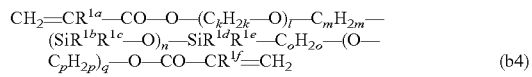

$$CH_2=CR^{1a}—CO—O—(C_kH_{2k}—O)_l—C_mH_{2m}—\\(SiR^{1b}R^{1c}—O)_n—SiR^{1d}R^{1e}—C_oH_{2o}—(O—\\C_pH_{2p})_q—O—CO—CR^{1f}=CH_2 \quad (b4)$$

In Formula (b4), $R^{1a}$ and $R^{1f}$ each represents a hydrogen atom or a methyl group, k and p each represents an integer of 2 to 5, l and q each represents a number of 0 to 50, m and o each represents an integer of 2 to 5, n represents a number of 3 to 80, and $R^{1b}$ to $R^{1e}$ each represents an alkyl group, an alkoxy group, a phenyl group, a substituted phenyl group, a phenoxy group, or a substituted phenoxy group.

In Formula (b4), $R^{1b}$ to $R^{1e}$ each has the same definition as that for $R^{3b}$ to $R^{3f}$, and the preferable aspects thereof are the same as described above.

k and p represent an integer of 2 to 5 and preferably 2 or 3 from the viewpoint of low cost. A combination of a monomer in which k and p represent 2 and a monomer in which k and p represent 3 can be used.

l and q each has the same definition as that for v in Formula (b1), and the preferable aspects thereof are the same as described above.

m and o represent an integer of 2 to 5 and preferably 2 or 3.

n has the same definition as that for x in Formula (b1), and the preferable aspects thereof are the same as described above.

Further, each of $R^{1a}$ to $R^{1f}$, k, l, m, n, o, p, and q is independent. In a case where the same symbols are present in or between molecules, these may be different from each other.

Specific examples of the polymerizable monomer (b4) in which l and q represent 0 include FM-7711, FM-7721, and FM-7725 (all trade names, manufactured by JNC Corporation).

From the viewpoint of improving the antifouling property, it is preferable that the polymerizable monomer (b) contain the polymerizable monomer (b1). The polymerizable monomer (b1) and any one or more of the polymerizable monomers (b2) to (b4) may be used in combination.

<Constituent Unit (C)>

The constituent unit (C) is a constituent unit derived from a macromonomer (c). In a case where the copolymer (X) has the constituent unit (C), the copolymer (X) can be formed into an organic solvent solution with a high solid content and a low viscosity. Further, a coating film containing the copolymer (X) exhibits an excellent hardness.

The macromonomer (c) is a compound containing a radically polymerizable group and having two or more constituent units derived from a monomer (hereinafter, also referred to as a "monomer (c1)") containing a radically polymerizable group.

Two or more constituent units of the macromonomer (c) may be the same as or different from each other.

A group having an ethylenically unsaturated bond is preferable as the radically polymerizable group of the macromonomer (c). Examples of the group having an ethylenically unsaturated bond include $CH_2=C(COOR)—CH_2—$, a (meth)acryloyl group, a 2-(hydroxymethyl)acryloyl group, and a vinyl group.

Here, R represents a hydrogen atom, an unsubstituted or substituted alkyl group, an unsubstituted or substituted alicyclic group, an unsubstituted or substituted aryl group, and an unsubstituted or substituted heterocyclic group.

Examples of the alkyl group as R include a branched or linear alkyl group having 1 to 20 carbon atoms. Specific examples of the branched or linear alkyl group having 1 to 20 carbon atoms include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

The alicyclic group as R may be monocyclic or polycyclic, and examples thereof include an alicyclic group having 3 to 20 carbon atoms. As the alicyclic group, a saturated alicyclic group such as a cycloalkyl group is preferable, and specific examples thereof include a cyclopropyl group, a cyclobutyl group, a cyclopentyl group, a cyclohexyl group, a cycloheptyl group, a bicyclo[2.2.1]heptyl group, a cyclooctyl group, and an adamantyl group.

Examples of the aryl group as R include an aryl group having 6 to 18 carbon atoms.

Specific examples of the aryl group having 6 to 18 carbon atoms include a phenyl group and a naphthyl group.

Examples of the heterocyclic group as R include a heterocyclic group having 5 to 18 carbon atoms.

Specific examples of the heterocyclic group having 5 to 18 carbon atoms include an oxygen atom-containing heterocyclic group such as a γ-butyrolactone group or a ε-caprolactone group, a nitrogen atom-containing heterocyclic group such as a pyridyl group, a carbazolyl group, a pyrrolidinyl group, or a pyrrolidone group, and a morpholino group.

Each of the alkyl group, the alicyclic group, the aryl group, and the heterocyclic group may have a substituent. Examples of the substituent include at least one selected from the group consisting of an alkyl group (here, excluding a case where R represents an alkyl group having a substituent), an aryl group, $—COOR^{51}$, a cyano group, $—OR^{52}$, $—NR^{53}R^{54}$, $—CONR^{55}R^{56}$, a halogen atom, an allyl group, an epoxy group, a siloxy group, and a hydrophilic or ionic group.

Here, $R^{51}$ to $R^{56}$ each independently represents a hydrogen atom, an alkyl group, an alicyclic group, or an aryl group. Examples of these groups are the same as those described above.

Examples of the alkyl group and the aryl group as the substituents are the same as those exemplified as the alkyl group and the aryl group represented by R.

It is preferable that $R^{51}$ in $—COOR^{51}$ as the substituent represent a hydrogen atom or an alkyl group. That is, it is preferable that $—COOR^{51}$ represent a carboxy group or an alkoxycarbonyl group. Examples of the alkoxycarbonyl group include a methoxycarbonyl group.

It is preferable that $R^{52}$ in $—OR^{52}$ as the substituent represent a hydrogen atom or an unsubstituted alkyl group. That is, it is preferable that $—OR^{52}$ represent a hydroxy group or an alkoxy group. Examples of the alkoxy group include an alkoxy group having 1 to 12 carbon atoms, and specific examples thereof include a methoxy group.

Examples of —NR$^{53}$R$^{54}$ as the substituent include an amino group, a monomethylamino group, and a dimethyl amino group.

Examples of —CONR$^{55}$R$^{56}$ as the substituent include a carbamoyl group (—CONH$_2$), an N-methylcarbamoyl group (—CONHCH$_3$), and an N,N-dimethylcarbamoyl group (dimethyl amide group: —CON(CH$_3$)$_2$).

Examples of the halogen atom as the substituent include a fluorine atom, a chlorine atom, a bromine atom, and an iodine atom.

Examples of the hydrophilic or ionic group as the substituent include an alkali salt of a carboxy group or an alkali salt of a sulfoxy group, a poly(alkylene oxide) group such as a polyethylene oxide group or a polypropylene oxide group, and a cationic substituent such as a quaternary ammonium.

R preferably represents an alkyl group or a saturated alicyclic group and more preferably an alkyl group or a saturated alicyclic group containing an alkyl group as an unsubstituted or substituted group.

Among these, from the viewpoint of availability, a methyl group, an ethyl group, an n-propyl group, an i-propyl group, an n-butyl group, a t-butyl group, a pentyl group, a hexyl group, a heptyl group, or an octyl group is preferable, and a methyl group, an ethyl group, an n-propyl group, an i-propyl group, an n-butyl group, a t-butyl group, a cyclopropyl group, a cyclobutyl group, an isobornyl group, or an adamantyl group is more preferable.

As the radically polymerizable group contained in the monomer (c1), a group having an ethylenically unsaturated bond is preferable, similar to the radically polymerizable group contained in the macromonomer (c).

As the monomer (c1), various monomers can be used, and examples thereof include hydrocarbon group-containing (meth)acrylic acid ester such as methyl (meth)acrylate, ethyl (meth)acrylate, n-propyl (meth)acrylate, isopropyl (meth) acrylate, n-butyl (meth)acrylate, isobutyl (meth)acrylate, t-butyl (meth)acrylate, isoamyl (meth)acrylate, hexyl (meth) acrylate, 2-ethylhexyl (meth)acrylate, octyl (meth)acrylate, lauryl (meth)acrylate, stearyl (meth)acrylate, isostearyl (meth)acrylate, hexadecyl (meth)acrylate, nonyl (meth) acrylate, isononyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentyl (meth) acrylate, dicyclopentenyl (meth)acrylate, dicyclopentenyloxyethyl (meth)acrylate, terpene acrylate or a derivative thereof, hydrogenated rosin acrylate or a derivative thereof, or docosyl (meth)acrylate; hydroxyl group-containing (meth)acrylic acid ester such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, or glycerol (meth)acrylate; a carboxyl group-containing vinyl-based monomer such as (meth)acrylic acid, 2-(meth)acryloyloxyethyl hexahydrophthalic acid, 2-(meth)acryloyloxypropyl hexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropyl maleic acid, 2-(meth) acryloyloxyethylsuccinic acid, 2-(meth)acryloyloxypropyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, or monoethyl citaconate; an acid anhydride group-containing vinyl-based monomer such as maleic anhydride or itaconic anhydride; an unsaturated dicarboxylic acid diester monomer such as dimethyl maleate, dibutyl maleate, dimethyl fumarate, dibutyl fumarate, dibutyl itaconate, or diperfluorocyclohexyl fumarate; an epoxy group-containing vinyl-based monomer such as glycidyl (meth)acrylate, glycidyl α-ethyl acrylate, or 3,4-epoxybutyl (meth)acrylate; an amino group-containing (meth)acrylic acid ester-based vinyl-based monomer such as dimethylaminoethyl (meth)acrylate or diethylaminoethyl (meth)acrylate; a vinyl-based monomer containing an amide group such as (meth)acrylamide, N-t-butyl (meth)acrylamide, N-methylol (meth)acrylamide, N-isopropylacrylamide, hydroxyethylacrylamide, N-methoxymethyl (meth)acrylamide, N-butoxymethyl (meth)acrylamide, diacetone acrylamide, maleic acid amide, or maleimide; a vinyl-based monomer such as styrene, α-methyl styrene, vinyl toluene, (meth) acrylonitrile, vinyl chloride, vinyl acetate, or vinyl propionate; a polyfunctional vinyl-based monomer such as divinyl benzene, ethylene glycol di(meth)acrylate, 1,3-butylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, neopentyl glycol di(meth)acrylate, 1,9-nonanediol di(meth) acrylate, 1,10-decanediol di(meth)acrylate, trimethylolpropane tri(meth)acrylate, pentaerythritol tetra(meth)acrylate, dipentaerythritol hexa(meth)acrylate, allyl (meth)acrylate, triallyl cyanurate, diallyl maleate, polypropylene glycol diallyl ether, or N,N'-methylene bis(meth)acrylamide; acryloyl morpholine, polyethylene glycol (meth)acrylate, polypropylene glycol (meth)acrylate, methoxyethyl (meth)acrylate, ethoxyethyl (meth)acrylate, n-butoxyethyl (meth) acrylate, isobutoxyethyl (meth)acrylate, t-butoxyethyl (meth)acrylate, ethoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "PLACCEL FM" (trade name, manufactured by Daicel Corporation, caprolactone addition monomer), "BLEMMER PME-100" (trade name, manufactured by NOF Corporation, methoxypolyethylene glycol methacrylate (the number of chains of ethylene glycol is 2), "BLEMMER PME-200" (trade name, manufactured by NOF Corporation, methoxypolyethylene glycol methacrylate (the number of chains of ethylene glycol is 4), "BLEMMER PME-400" (trade name, manufactured by NOF Corporation, methoxypolyethylene glycol methacrylate (the number of chains of ethylene glycol is 9), "BLEMMER 50POEP-800B" (trade name, manufactured by NOF Corporation, octoxypolyethylene glycol-polypropylene glycol-methacrylate (the number of chains of ethylene glycol is 8 and the number of chains of propylene glycol is 6), "BLEMMER 20ANEP-600" (trade name, manufactured by NOF Corporation, nonyl phenoxy (ethylene glycol-polypropylene glycol) monoacrylate), "BLEMMER AME-100" (trade name, manufactured by NOF Corporation), "BLEMMER AME-200" (trade name, manufactured by NOF Corporation), "BLEMMER 50AOEP-800B" (trade name, manufactured by NOF Corporation), "SILAPLANE FM-0711" (trade name, manufactured by JNC Corporation), "SILAPLANE FM-0721" (trade name, manufactured by JNC Corporation), "SILAPLANE FM-0725" (trade name, manufactured by JNC Corporation), "SILAPLANE TM-0701" (trade name, manufactured by JNC Corporation), "SILAPLANE TM-0701T" (trade name, manufactured by JNC Corporation), X-22-174DX (trade name, manufactured by Shin-Etsu Chemical Co., Ltd.), X-22-2426 (trade name, manufactured by Shin-Etsu Chemical Co., Ltd.), X-22-2475 (trade name, manufactured by Shin-Etsu Chemical Co., Ltd.), a silane coupling agent-containing monomer such as 3-(meth)acryloxypropyltrimethoxysilane, 3-(meth)acryloxypropylmethyldiethoxysilane, 3-(meth)acryloxypropyltriethoxysilane, 3-acryloxypropyltrimethoxysilane, vinyltrimethoxysilane, or vinyltriethoxysilane; an organosilyl group-containing monomer other than the silane coupling agent-containing monomer, such as the monomer (a2); a halogenated olefin such as vinyl chloride, vinylidene chloride, vinyl fluoride, vinylidene fluoride, or chlorotrifluoroethylene; a fluorine-containing monomer (here, excluding the halogenated olefin) such as 2,2,2-trifluoroethyl (meth)acrylate, 2,2,3,3,3-pentafluorophenyl (meth)acrylate, 2-(perfluorobutyl)ethyl (meth)acrylate, 3-(perfluorobutyl)-2-hydroxypropyl (meth) acrylate, 2-(perfluorohexyl)ethyl (meth)acryl ate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate,1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, or 1,2,2,2-tetrafluoro-1-(trifluoromethyl)ethyl (meth)acrylate, a monomer having an acetal structure such as 1-butoxyethyl (meth)acrylate, 1-(2-ethylhexyloxy) ethyl (meth)acrylate, 1-(cyclohexyloxy)ethyl methacrylate, or 2-tetrahydropyranyl (meth)acrylate, 4-methacryloyloxy benzophenone, and 2-isocyanate ethyl (meth)acrylate. These monomers may be used alone or in combination of two or more kinds thereof.

It is preferable that at least a part of the monomer (c1) be a (meth)acrylic monomer.

As the constituent unit derived from the monomer (c1), a constituent unit represented by Formula (c') (hereinafter, also referred to as a "constituent unit (c')") is preferable. That is, it is preferable that the macromonomer (c) contain a radically polymerizable group and two or more constituent units (c').

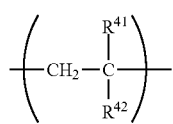

(In Formula (c'), $R^{41}$ represents a hydrogen atom, a methyl group, or $CH_2OH$, $R^{42}$ represents $OR^{43}$, a halogen atom, $COR^{44}$, $COOR^{45}$, CN, $CONR^{46}R^{47}$, or $R^{48}$, $R^{43}$ to $R^{47}$ each independently represents a hydrogen atom, an alkyl group having an unsubstituted or substituted group, an alicyclic group having an unsubstituted or substituted group, an aryl group having an unsubstituted or substituted group, a heteroaryl group having an unsubstituted or substituted group, a non-aromatic heterocyclic group having an unsubstituted or substituted group, an aralkyl group having an unsubstituted or substituted group, an alkaryl group having an unsubstituted or substituted group, or an organosilyl group having an unsubstituted or substituted group, and $R^{45}$ represents an aryl group having an unsubstituted or substituted group or a heteroaryl group having an unsubstituted or substituted group)

Examples of the alkyl group, the alicyclic group, and the aryl group as $R^{43}$ to $R^{47}$ are the same as those exemplified as the alkyl group, the alicyclic group, and the aryl group as R described above.

Examples of the heteroaryl group include a pyridyl group and a carbazolyl group.

Examples of the non-aromatic heterocyclic group include a pyrrolidinyl group and a pyrrolidone group.

Examples of the aralkyl group include a benzyl group and a phenylethyl group.

Examples of the organosilyl group include a triorganosilyl group. Examples of the triorganosilyl group are the same as those exemplified as the triorganosilyl group (such as $-SiR^{14}R^{15}R^{16}$) in the triorganosilyloxycarbonyl group of the constituent unit (A2).

Each of the alkyl group, the alicyclic group, the aryl group, the heteroaryl group, the non-aromatic heterocyclic group, the aralkyl group, the alkaryl group, and the organosilyl group may have a substituent. Examples of the substituent include a carboxylic acid group (COOH), a carboxylic acid ester group, an epoxy group, a hydroxy group, an alkoxy group, a primary amino group, a secondary amino group, a tertiary amino group, an isocyanate group, a sulfonic acid group ($SO_3H$), and a halogen atom.

Examples of the carboxylic acid ester group include a group in which $R^{51}$ in $-COOR^{51}$ described in the section of R represents an alkyl group, an alicyclic group, or an aryl group.

Examples of the alkoxy group include a group in which $R^{52}$ in $OR^{52}$ represents an alkyl group.

Examples of the secondary amino group include a group in which $R^{53}$ in $-NR^{53}R^{54}$ represents a hydrogen atom and $R^{54}$ represents an alkyl group, an alicyclic group, or an aryl group.

Examples of the tertiary amino group include a group $R^{53}$ and $R^{54}$ in $-NR^{53}R^{54}$ each represents an alkyl group, an alicyclic group, or an aryl group.

Examples of the alkyl group, the aryl group, and the halogen atom are the same as described above.

Examples of the aryl group and the heteroaryl group as $R^{48}$ are the same as those described above.

Each of the aryl group and the heteroaryl group may have a substituent. Examples of the substituent include a carboxylic acid group, a carboxylic acid ester group, an epoxy group, a hydroxy group, an alkoxy group, a primary amino group, a secondary amino group, a tertiary amino group, an isocyanate group, a sulfonic acid group, and a halogen atom.

Examples of the carboxylic acid ester group, the alkoxy group, the primary amino group, the secondary amino group, the tertiary amino group, the alkyl group, the aryl group, and the halogen atom are the same as those described above.

Examples of the olefin group include an allyl group. The olefin group may have a substituent. Examples of the substituent in the olefin group are the same as those exemplified as the substituent represented by $R^{48}$.

As the constituent unit (c'), a constituent unit in which $R^{41}$ represents a hydrogen atom or a methyl group and $R^{42}$ represents $COOR^{45}$ is preferable. It is preferable that $R^{45}$ represent a hydrogen atom, an alkyl group, a saturated alicyclic group, an aryl group, a heteroaryl group, or a non-aromatic heterocyclic group.

The constituent unit (c') is a constituent unit derived from $CH_2=CR^{41}R^{42}$. Specific examples of $CH_2=CR41R^{42}$ include a hydrophobic group-containing (meth)acrylic acid ester monomer such as substituted or unsubstituted alkyl (meth)acrylate [for example, methyl (meth)acrylate, ethyl (meth)acrylate, n-propyl (meth)acrylate, i-propyl (meth) acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, behenyl (meth)acryl ate, 1-methyl-2-methoxyethyl (meth)acrylate, 3-methoxybutyl (meth)acrylate, or 3-methyl-3-methoxybutyl (meth)acrylate], substituted or unsubstituted aralkyl (meth)acrylate [for example, benzyl (meth)acrylate, m-methoxyphenylmethyl (meth)acrylate, or p-methoxyphenylethyl (meth)acrylate], substituted or unsubstituted aryl (meth)acrylate [for example, phenyl (meth)acrylate, m-methoxyphenyl (meth)acrylate, p-methoxyphenyl (meth)acrylate, or o-methoxyphenylethyl (meth)acrylate], alicyclic (meth)acrylate [for example, isobornyl (meth)acrylate or cyclohexyl (meth)acrylate], or halogen atom-containing (meth)acrylate [for example, trifluoroethyl (meth)acrylate, perfluorooctyl (meth)acrylate, or perfluorocyclohexyl (meth)acrylate]; an oxyethylene group-containing (meth)acrylic acid ester monomer such as 2-methoxyethyl (meth)acrylate, 2-ethoxyethyl (meth)acrylate, 2-butoxyethyl (meth)acrylate, butoxydiethylene glycol (meth)acrylate, methoxytriethylene glycol (meth)acrylate, methoxypolyethylene glycol (meth)acrylate, phenoxyethyl (meth)acrylate, or 2-(2-ethylhexaoxy)ethyl (meth)acrylate; a hydroxyl group-containing (meth)acrylic acid ester monomer such as 2-hydroxyethyl (meth)acrylate, 2-hydroxypropyl (meth)acrylate, 4-hydroxybutyl (meth)acrylate, or glycerol (meth)acrylate; a terminal alkoxy allylated polyether monomer such as methoxypolyethylene glycol allyl ether, methoxypolypropylene glycol allyl ether, butoxypolyethylene glycol allyl ether, butoxypolypropylene glycol allyl ether, methoxypolyethylene glycol-polypropylene glycol ally ether, or butoxypolyethylene glycol-polypropylene glycol allyl ether; an epoxy group-containing vinyl monomer such as glycidyl (meth)acrylate, glycidyl α-ethyl acrylate, or 3,4-epoxybutyl (meth)acrylate; a primary or secondary amino group-containing vinyl monomer such as butyl aminoethyl (meth)acrylate or (meth)acrylamide; a tertiary amino group-containing vinyl monomer such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide, or dimethylaminopropyl (meth)acrylamide; a heterocyclic basic monomer such as vinylpyrrolidone, vinylpyridine, or vinyl carbazole; an organosilyl group-containing vinyl monomer such as trimethyl silyl (meth)acrylate, triethyl silyl (meth)acrylate, tri-n-propyl silyl (meth)acrylate, tri-n-butyl silyl (meth)acrylate, tri-n-amyl silyl (meth)acrylate, tri-n-hexyl silyl (meth)acrylate, tri-n-octyl silyl (meth)acrylate, tri-n-dodecyl silyl (meth)acrylate, triphenyl silyl (meth)acrylate, tri-p-methyl phenyl silyl (meth)acryl ate, tribenzyl silyl (meth)acryl ate, triisopropyl silyl (meth)acrylate, triisobutyl silyl (meth)acrylate, tri-s-butyl silyl (meth)acrylate, tri-2-methyl-isopropylsilyl (meth)acrylate, tri-t-butyl silyl (meth)acrylate, ethyl dimethyl silyl (meth)acrylate, n-butyl dimethyl silyl (meth)acrylate, diisopropyl-n-butyl silyl (meth)acrylate, n-octyl di-n-butyl silyl (meth)acrylate, diisopropyl stearyl silyl (meth)acrylate, dicyclohexyl phenyl silyl (meth)acrylate, t-butyl diphenyl silyl (meth)acrylate, or lauryl diphenyl silyl (meth)acrylate; a carboxy group-containing ethylenically unsaturated monomer such as methacrylic acid, acrylic acid, vinylbenzoic acid, tetrahydrophthalic acid monohydroxyethyl (meth)acrylate, tetrahydrophthalic acid monohydroxypropyl (meth)acrylate, tetrahydrophthalic acid monohydroxybutyl (meth)acrylate, phthalic acid monohydroxyethyl (meth)acrylate, phthalic acid monohydroxypropyl (meth)acrylate, succinic acid monohydroxyethyl (meth)acryl ate, succinic acid monohydroxypropyl (meth)acrylate, maleic acid monohydroxyethyl (meth)acrylate, or maleic acid monohydroxypropyl (meth)acrylate; a cyano group-containing vinyl monomer such as acrylonitrile or methacrylonitrile; a vinyl ether monomer such as alkyl vinyl ether [for example, ethyl vinyl ether, propyl vinyl ether, butyl vinyl ether, hexyl vinyl ether, or 2-ethyl hexyl vinyl ether], or cyanoalkyl vinyl ether [such as cyclohexyl vinyl ether]; a vinyl ester monomer such as vinyl acetate, vinyl propionate, vinyl butyrate, or vinyl benzoate; an aromatic vinyl monomer such as styrene, vinyl toluene, or α-methyl styrene; and a halogenated olefin such as vinyl chloride or vinyl fluoride.

The macromonomer (c) may further have constituent units other than the constituent unit (c'). Examples of other constituent units include a constituent unit derived from a monomer that do not correspond to $CH_2=CR^{414}R^2$ among the examples of the monomer (c1) described above.

Specific preferred examples of other constituent units include constituent units derived from the following monomers.

Examples thereof include an organosilyl group-containing vinyl monomer such as triisopropyl silyl methyl malate, triisopropyl silyl amyl fumarate, tri-n-butylsilyl-n-butyl fumarate, t-butyl diphenyl silyl methyl fumarate, t-butyl diphenylsilyl-n-butyl fumarate, triisopropyl silyl methyl fumarate, triisopropyl silyl amyl fumarate, tri-n-butylsilyl-n-butyl fumarate, t-butyl diphenyl silyl methyl fumarate, or t-butyl diphenylsilyl-n-butyl fumarate; an acid anhydride group-containing vinyl monomer such as maleic anhydride or itaconic anhydride; a carboxy group-containing ethylenically unsaturated monomer such as crotonic acid, fumaric acid, itaconic acid, maleic acid, citraconic acid, monomethyl maleate, monoethyl maleate, monobutyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, or monoethyl citraconate; an unsaturated dicarboxylic acid diester monomer such as dimethyl malate, dibutyl malate, dimethyl fumarate, dibutyl fumarate, dibutyl itaconate, or diperfluorocyclohexyl fumarate; a halogenated olefin such as vinylidene chloride, vinylidene fluoride, or chlorotrifluoroethylene; and a polyfunctional monomer such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl methacrylate, triallyl cyanurate, diallyl maleate, or polypropylene glycol diallyl ether.

As the macromonomer (c), a macromonomer obtained by introducing a radically polymerizable group to a terminal of the main chain having two or more constituent units (c') is preferable, and a macromonomer represented by Formula (c-1) is more preferable.

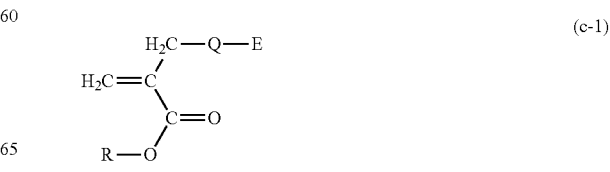

(c-1)

(In Formula (c-1), R has the same definition as described above, Q represents a main chain moiety having two or more constituent units (c'), and E represents a terminal group.)

In Formula (c-1), R has the same definition as that for R in $CH_2=C(COOR)-CH_2-$, and the preferable aspects thereof are the same as described above.

In Formula (c-1), two or more constituent units (c') contained in Q may be the same as or different from one another.

Q may be formed of only the constituent unit (c') and may further have constituent units other than the constituent unit (c').

It is preferable that the number of constituent units constituting Q be set to a value such that the number-average molecular weight of the macromonomer (c) is in the preferable range described below.

In Formula (c-1), E represents a hydrogen atom, a group derived from a radical polymerization initiator, or a radically polymerizable group, similar to a terminal group of a polymer obtained by carrying out known radical polymerization.

As the macromonomer (c), a macromonomer represented by Formula (c-2) is particularly preferable.

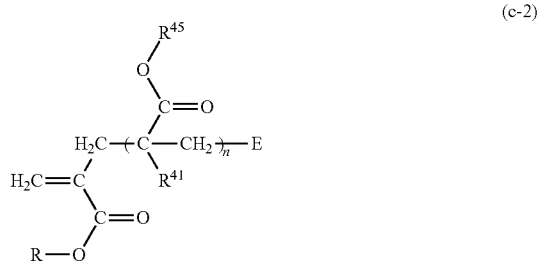

(In Formula (c-2), R, $R^{41}$ $R^{45}$, and E each has the same definition as described above, and n represents a natural number of 2 or greater.)

In Formula (c-2), it is preferable that n be set to a value such that the number-average molecular weight (Mn) of the macromonomer (c) is in a range of 500 to 50000. A more preferable range of the number-average molecular weight thereof is as follows.

n $R^{41}$'s may be the same as or different from one another.
n $R^{45}$'s may be the same as or different from one another.

The number-average molecular weight (Mn) of the macromonomer (c) is preferably in a range of 500 to 50000, more preferably 500 or greater and less than 50000, still more preferably in a range of 800 to 30000, and particularly preferably in a range of 1000 to 20000. In a case where the number-average molecular weight of the macromonomer (c) is greater than or equal to the above-described lower limit, the hardness and the water resistance of the coating film are further improved. In a case where the number-average molecular weight of the macromonomer (c) is less than or equal to the above-described upper limit, the viscosities of the solution containing the copolymer (X), the resin composition containing the solution, and the antifouling paint composition tend decrease.

The number-average molecular weight of the macromonomer (c) is measured by gel permeation chromatography (GPC) using polyethylene as a reference substance.

The number-average molecular weight of the macromonomer (c) can be adjusted based on the amount of a polymerization initiator or a chain transfer agent to be used at the time of production of the macromonomer (c).

Therefore, as the macromonomer (c), a macromonomer having two or more constituent units (c') and a number-average molecular weight (Mn) of 500 to 50000 is preferable. The preferable kind of the constituent unit (c') in the macromonomer and the preferable range of the number-average molecular weight thereof are the same as described above.

The glass transition temperature of the macromonomer (c) is preferably in a range of −50° C. to 120° C., more preferably in a range of −20° C. to 100° C., and still more preferably in a range of 20° C. to 80° C. In a case where the glass transition temperature of the macromonomer (c) is greater than or equal to the above-described lower limit, the hardness and the water resistance of the coating film are further improved. In a case where the glass transition temperature of the macromonomer (c) is less than or equal to the above-described upper limit, the storage stability of the solution containing the copolymer (X) and the compositions containing the solution (the resin composition or the antifouling paint composition) is further improved. Further, the solution and the compositions can be easily formed to have a high solid content and a low viscosity.

The glass transition temperature of the macromonomer (c) can be measured using a differential scanning calorimeter (DSC).

The glass transition temperature of the macromonomer (c) can be adjusted based on the composition and the like of the monomer forming the macromonomer (c).

The macromonomer (c) may be produced according to a known method, or a commercially available product may be used as the macromonomer.

Examples of the method of producing the macromonomer (c) include a production method of using a cobalt chain transfer agent, a method of using an α-substituted unsaturated compound such as an α-methylstyrene dimer as a chain transfer agent, a method of chemically bonding a radically polymerizable group to a polymer, and a method of carrying out thermal decomposition.

Among these, from the viewpoint that the number of production steps is small and a catalyst with a high chain transfer constant is used, the production method of using a cobalt chain transfer agent is preferable as the method of producing the macromonomer (c). Further, the macromonomer (c) in a case of being produced using a cobalt chain transfer agent has a structure represented by Formula (c-1).

Examples of the method of producing the macromonomer (c) using a cobalt chain transfer agent include a bulk polymerization method, a solution polymerization method, and an aqueous dispersion polymerization method such as a suspension polymerization method or an emulsion polymerization method. From the viewpoint that a recovery step is simple, the aqueous dispersion polymerization method is preferable.

Examples of chemically bonding a radically polymerizable group to a polymer include a production method of substituting a halogen group of a polymer containing the halogen group with a radically polymerizable compound having a carbon-carbon double bond; A method of reacting a vinyl-based monomer containing an acid group with a vinyl-based polymer containing an epoxy group; a method of reacting a vinyl-based polymer containing an epoxy group with a vinyl-based monomer containing an acid group; and a method of reacting a vinyl-based polymer containing a hydroxyl group with a diisocyanate compound to obtain a vinyl-based polymer containing an isocyanate group and reacting this vinyl-based polymer with a vinyl-based monomer containing a hydroxyl group. The macromonomer may be produced using any of the above-described methods.

<Constituent Unit (D)>

The constituent unit (D) is not particularly limited, and examples thereof include constituent units derived from a polymerizable monomer (hereinafter, also referred to as a "polymerizable monomer (d)") other than the polymerizable monomer (a1), the polymerizable monomer (a2), the polymerizable monomer (a3), the polymerizable monomer (b), and the macromonomer (c).

The polymerizable monomer (d) is not particularly limited as long as the polymerizable monomer is copolymerizable with the polymerizable monomer (a1), the polymerizable monomer (a2), the polymerizable monomer (a3), the polymerizable monomer (b), and the macromonomer (c), and various monomers containing a radically polymerizable group such as an ethylenically unsaturated bond can be used. For example, those exemplified as the monomer (c1) used to obtain the macromonomer (c) can be used.

From the viewpoint that the copolymer (X) is easily formed to have a high solid content and a low viscosity at the time of being dissolved in an organic solvent, it is preferable that the constituent unit (D) be a constituent unit derived from a monofunctional monomer having one ethylenically unsaturated bond and particularly preferable that an ethylenically unsaturated bond be derived from an acryloyl group. That is, it is particularly preferable that the constituent unit (D) be a constituent unit derived from a monofunctional monomer containing one acryloyl group.

From the viewpoint of improving the plasticity, the crack resistance, and the peeling resistance of a coating film to be formed and the self-polishing properties for a long period of time with a good balance therebetween, it is preferable that the constituent unit (D) have a constituent unit derived from hydrophobic group-containing (meth)acrylic acid ester.

Examples of the hydrophobic group-containing (meth) acrylic acid ester include those exemplified as $CH_2=CR^{41}R^{42}$ described above. Among the examples, alkyl (meth)acrylate is preferable.

From the viewpoint of improving the solubility and the crack resistance of a coating film to be formed, it is preferable that the constituent unit (D) have a constituent unit derived from oxyethylene group-containing (meth) acrylic acid ester.

As the oxyethylene group-containing (meth)acrylic acid ester, a compound represented by Formula (d1) is preferable.

(In Formula (d1) $Z^1$ represents an acryloyl group or a methacryloyloxy group, $R^{50}$ represents a hydrogen atom, an alkyl group having 1 to 10 carbon atoms, or an aryl group, and n represents an integer of 1 to 15.)

In Formula (d1), as the result of comparison of a case where $Z^1$ represents an acryloyloxy group to a case where $Z^1$ represents a methacryloyloxy group, the hydrolysis rate tends to be higher in the case where $Z^1$ represents an acryloyloxy group, and any case can be optionally selected depending on the dissolution rate.

In Formula (d1), examples of the alkyl group having 1 to 10 carbon atoms, and the aryl group as $R^{50}$ are the same as those exemplified as $R^1$ and $R^3$.

In Formula (d1), from the viewpoints of the water resistance and the crack resistance, f preferably represents an integer of 1 to 10, more preferably an integer of 1 to 5, still more preferably an integer of 1 to 3, and particularly preferably 1 or 2.

As the polymerizable monomer (d), a commercially available product may be used or the monomer can be appropriately synthesized according to a known method.

(Content of Each Constituent Unit)

The content of the constituent unit (A) in the copolymer (X) is preferably in a range of 1% to 60% by mass, more preferably in a range of 5% to 50% by mass, and still more preferably in a range of 10% to 40% by mass with respect to the total amount (100% by mass) of all constituent units. In a case where the content of the constituent unit (A) is greater than or equal to the above-described lower limit, the self-polishing properties of a coating film to be formed are further improved. In a case where the content of the constituent unit (A) is less than or equal to the above-described upper limit, the coating film to be formed has an appropriate hydrolyzability, the self-polishing properties are maintained for a long period of time, and the antifouling effect is further improved.

The content of the constituent unit (B) in the copolymer (X) is preferably in a range of 1% to 80% by mass, more preferably in a range of 2% to 70% by mass, and still more preferably in a range of 5% to 60% by mass with respect to the total amount (100% by mass) of all constituent units. In a case where the content of the constituent unit (B) is greater than or equal to the above-described lower limit, the antifouling properties of a coating film are further improved. In a case where the content of the constituent unit (B) is less than or equal to the above-described upper limit, the crack resistance of a coating film to be formed is further improved.

The content of the constituent unit (C) in the copolymer (X) is preferably greater than 0% and 88% by mass or less, more preferably in a range of 2% to 70% by mass, and still more preferably in a range of 5% to 50% by mass with respect to the total amount (100% by mass) of all constituent units. In a case where the content of the constituent unit (C) is greater than or equal to the above-described lower limit, the viscosity of the solution at the time of dissolving the copolymer (X) in an organic solvent and the viscosity of the resin composition or the antifouling paint composition containing this solution are further decreased. Further, the hardness and the water resistance of a coating film to be formed are further improved. In a case where the content of the constituent unit (C) is less than or equal to the above-described upper limit, the crack resistance and the polymerization stability are further improved.

It is preferable that the copolymer (X) be a copolymer obtained by polymerizing a monomer mixture (α1) containing at least one polymerizable monomer (a) selected from the group consisting of the polymerizable monomer (a1), the polymerizable monomer (a2), and the polymerizable monomer (a3), the polymerizable monomer (b), and the macromonomer (c). In a case of such a copolymer, the water resistance of a coating film to be formed is further improved compared to a copolymer obtained by polymerizing a monomer mixture (β1) containing the polymerizable monomer (m0) containing an ethylenically unsaturated bond and a carboxy group, the polymerizable monomer (b), and the macromonomer (c) to obtain a copolymer (XO) containing a carboxy group and converting the carboxy group in this copolymer (XO) to any of the structure (I), a triorganosilyloxycarbonyl group, and the structure (III).

The monomer mixture (α1) and the monomer mixture (β1) will be described in detail below.

The weight-average molecular weight (Mw) of the copolymer (X) is preferably in a range of 1000 to 100000, more preferably in a range of 2000 to 80000, and still more preferably in a range of 3000 to 60000. In a case where the weight-average molecular weight is less than or equal to the above-described upper limit, the viscosity of the solution at the time of dissolving the copolymer (X) in an organic solvent is further decreased, and a composition with a high solid content and a low viscosity is easily obtained as the resin composition or the antifouling paint composition. Further, the antifouling properties of a coating film are further improved. The weight-average molecular weight thereof is greater than or equal to the above-described lower limit, the hardness and the durability of a coating film to be formed are further improved.

The number-average molecular weight (Mn) of the copolymer (X) is preferably in a range of 500 to 50000 and more preferably in a range of 1000 to 40000.

The molecular weight distribution (Mw/Mn) of the copolymer (X) is preferably in a range of 1.5 to 5.0 and more preferably in a range of 2.2 to 3.0.

The weight-average molecular weight and the number-average molecular weight of the copolymer (X) are measured by gel permeation chromatography (GPC) using polyethylene as a reference substance.

The acid value of the copolymer (X) is preferably in a range of 1 to 140 mgKOH/g, more preferably in a range of 5 to 130 mgKOH/g, and still more preferably in a range of 10 to 120 mgKOH/g. In a case where the acid value of the copolymer (X) is less than or equal to the above-described upper limit, the water resistance and the crack resistance of the coating film are further improved.

The acid value of the copolymer (X) is measured according to a known technique such as neutralization titration using a potassium hydroxide solution.

It is preferable that the copolymer (X) be a chain polymer that does not have a crosslinked structure. In a case where the copolymer (X) is a chain polymer, the viscosity of the organic solvent solution of the copolymer (X) is decreased compared to a case where the copolymer has a crosslinked structure.

(Method of Producing Copolymer (X))

Examples of the method of producing the copolymer (X) include the following production method (α).

The production method (α) is a method of polymerizing the monomer mixture (α1) containing at least one polymerizable monomer selected from the group consisting of the polymerizable monomer (a1), the polymerizable monomer (a2), and the polymerizable monomer (a3), the polymerizable monomer (b), and the macromonomer (c).

The monomer mixture (α1) may further contain the polymerizable monomer (d).

The composition of the monomer mixture (α1), that is, the kind of the monomers constituting the monomer mixture (α1) and the content (% by mass) of each monomer with respect to the total mass of all monomers are the same as the composition of the copolymer (X), that is, the kind of the constituent units derived from each monomer constituting the copolymer (X) and the content (% by mass) of each constituent unit with respect to the total mass of all constituent units.

Therefore, it is preferable that the monomer mixture (α1) be formed of 1% to 60% by mass of the polymerizable monomer (a), 1% to 60% by mass of the polymerizable monomer (b), greater than 0% by mass and 88% by mass or less of the macromonomer (c), and 0% by mass or greater and less than 98% by mass of the polymerizable monomer (d). The content of each polymer indicates the proportion of each monomer with respect to the total amount of the monomer mixture (α1), and the total amount of the polymerizable monomer (a), the polymerizable monomer (b), the macromonomer (c), and the polymerizable monomer (d) is 100% by mass. The preferable range of the content of each of the polymerizable monomers (a) and (b) and the macromonomer (c) is the same as the preferable content of the constituent unit corresponding to each monomer.

The method of polymerizing the monomer mixture (α1) is not particularly limited, and a known polymerization method such as a solution polymerization method, a suspension polymerization method, a bulk polymerization method, or an emulsion polymerization method can be used. From the viewpoints of the productivity and the performance of the coating film, a solution polymerization method is preferable.

The polymerization may be performed according to a known method using a known polymerization initiator. Examples of the known method include a method of allowing the monomer components to react at a reaction temperature of 60° C. to 120° C. for 4 to 14 hours in the presence of a radical polymerization initiator. During the polymerization, a chain transfer agent may be used as necessary.

As the radical polymerization initiator, a known initiator can be used, and examples thereof include an azo-based compound such as 2,2-azobis(isobutyronitrile), 2,2-azobis (2,4-dimethyl valeronitrile), or 2,2-azobis(2-methylbutyronitrile); and an organic peroxide such as benzoyl peroxide, cumene hydroperoxide, lauryl peroxide, di-t-butyl peroxide, or t-butylperoxy-2-ethylhexanoate. The content of the polymerization initiator is not particularly limited and can be appropriately set.

As the chain transfer agent, a known agent can be used, and examples thereof include mercaptans such as n-dodecyl mercaptan, thioglycolic acid esters such as octyl thioglycolate, an α-methylstyrene dimer, and terpinolene. The content of the chain transfer agent is not particularly limited and can be appropriately set.

As the solvent used for the solution polymerization, for example, a typical organic solvent such as toluene, xylene, methyl isobutyl ketone, or n-butyl acetate can be used.

However, the method of producing the copolymer (X) is not limited to the above-described production method (α).

For example, the copolymer (X) can be produced using the following production method (β).

The polymerization method (β) is a method of polymerizing a monomer mixture (β1) containing the polymerizable monomer (m0) containing an ethylenically unsaturated bond and a carboxy group, the polymerizable monomer (b), and the macromonomer (c) to obtain a copolymer (XO) containing a carboxy group and converting the carboxy group in this copolymer (XO) to any of the structure (I), a triorganosilyloxycarbonyl group, and the structure (III).

Examples of the polymerizable monomer (m0) are the same as those exemplified as the polymerizable monomer (a1).

The monomer mixture (β1) may contain the polymerizable monomer (d).

The composition of the monomer mixture (β1) is the same as the composition of the monomer mixture (α1) except that the polymerizable monomer (a) is the polymerizable monomer (m0).

The polymerization of the monomer mixture (β1) can be carried out in the same manner as the polymerization of the monomer mixture (α1) in the production method (α).

Examples of the method of converting the carboxy group in the copolymer (X0) to the structure (I) include a method of causing a reaction (addition reaction) between the copolymer (X0) and the compound (Y). The reaction between the copolymer (X0) and the compound (Y) can be carried out in the same manner as the reaction between the polymerizable monomer (m0) and the compound (Y).

Examples of the method of converting the carboxy group in the copolymer (X0) to the structure (III) include a method of reacting the copolymer (X0) with an organic acid metal salt such as copper acetate or zinc acetate. The metal of the organic acid metal salt corresponds to M described above. The reaction between the copolymer (X0) and the organic acid metal salt can be carried out by increasing the temperature to the reflux temperature and continuing the reaction for 10 to 20 hours while removing the mixed solution of an organic acid such as acetic acid to be distilled, water, and an organic solvent and replenishing the same amount of the organic solvent.

Since the copolymer (X) has any one or more of the constituent unit (A), the structure (I), the triorganosilyloxycarbonyl group, and the structure (III), hydrolysis in sea water or the like can be carried out. Therefore, the coating film containing the copolymer (X) exhibits self-polishing properties in sea water or the like. Further, since the copolymer (X) has the constituent unit (B) and the polysiloxane block, marine organisms or other kinds of dirt are unlikely to be attached onto the surface of the coating film containing the copolymer (X). Accordingly, the coating film containing the copolymer (X) can exhibit an excellent antifouling effect even in a case where the coating film does not contain an antifouling agent.

Further, since the copolymer (X) has the constituent unit (C), an organic solvent solution with a high solid content and a low viscosity can be formed. Further, the coating film containing the copolymer (X) has a high hardness.

Therefore, excellent block resistance is expected. Such an effect is considered to be exhibited because the coating film forms a micro phase separation structure using the macromonomer (c).

[Resin Composition]

The resin composition of the present invention contains the copolymer (X) described above. The copolymer (X) contained in the resin composition may be used alone or in combination of two or more kinds thereof.

The content of the copolymer (X) in the resin composition of the present invention is not particularly limited, but is preferably 45% by mass or greater, more preferably 50% by mass or greater, and still more preferably 55% by mass or greater with respect to the total amount of the resin composition. In a case where the content of the copolymer (X) is greater than or equal to the above-described lower limit, an antifouling paint composition with a small VOC content can be easily obtained.

The upper limit of the content of the copolymer (X) is not particularly limited and may be 100% by mass. In a case where the resin composition contains a solvent, the content of the solvent is preferably set to an amount such that the viscosity of the resin composition at 25° C. is less than or equal to the preferable upper limit described below. Specifically, the content of the solvent varies depending on the weight-average molecular weight of the copolymer (X), the glass transition temperature, and the presence of the crosslinked structure, but is preferably 85% by mass or less and more preferably 80% by mass or less with respect to the total amount of the resin composition.

In a case where the copolymer (X) has the constituent unit (A1), it is preferable that the resin composition of the present invention further contain at least one selected from the group consisting of a compound reacting with an acid, a basic compound, an acidic compound, and a dehydrating agent. In this manner, the storage stability of the resin composition and the antifouling paint composition containing this resin composition is improved.

In a case where the copolymer (X) has the constituent unit (A1), in the resin composition containing the copolymer (X) and the antifouling paint composition containing this resin composition, the structure (I) during storage may be decomposed unintentionally. In a case where the structure (I) is decomposed, a carboxylic acid is generated. In this manner, the glass transition temperature of the copolymer (X) is increased, and the carboxylic acid and other components in the paint form a crosslinked structure and thus the viscosity of the solution of the copolymer (X) or the paint containing this solution may be increased. Further, generation of a free carboxylic acid results in degradation of the stability of dissolution in an organic solvent and the water resistance. In addition, by catalytically promoting the hydrolysis reaction of the generated carboxylic acid as an acid, decomposition of the structure (I) advances. In a case where the resin composition contains a compound that reacts with an acid, a carboxylic acid is captured by the compound that reacts with an acid at the time of decomposition of the structure (I) in the copolymer (X) to generate a carboxylic acid, and the storage stability is improved.

Further, in a high pH region or a low pH region, the storage stability is degraded due to the decomposition of the structure (I). In a high pH region, the storage stability is also degraded due to a decrease in the reactivity between the compound (Y) and the carboxylic acid. The decomposition of the structure (I) is suppressed and the degradation of the storage stability can be suppressed by adjusting the pH of the resin composition through addition of a basic compound or an acidic compound.

Further, the moisture promotes decomposition (hydrolysis) of the structure (I). In a case where the resin composition contains a dehydrating agent, the moisture in the resin composition is captured so that degradation of the storage stability can be suppressed.

Examples of the compound that reacts with an acid include the compound (Y), a basic compound, and a compound containing an epoxy group.

Examples of the basic compound include dimethylamine, diethylamine, trimethylamine, trimethylamine, aniline, and pyridine.

Examples of the compound containing an epoxy group include 2-ethyloxysilane, 2,3-dimethyloxysilane, 2,2-dimethyloxysilane, glycidyl (meth)acrylate, glycidyl α-ethyl acrylate, and 3,4-epoxybutyl (meth)acrylate.

From the viewpoint of the storage stability, the compound (Y) is preferable as the compound that reacts with an acid. Among the examples of the compound, as the compound (Y), 1-alkenyl alkyl ether in which X in formula (31) represents —O— is preferable, and vinyl ethers such as butyl vinyl ether and isobutyl vinyl ether are more preferable from the viewpoint that the effect of improving the storage stability is further improved.

Examples of the basic compound used for adjusting the pH are the same as those exemplified as the basic compound described above.

Examples of the acidic compound include abietic acid, neoabietic acid, parastrinic acid, pimaric acid, isopimaric acid, levopimaric acid, dextropimaric acid, sandaracopimaric acid, acetic acid, propionic acid, butyric acid, lauric acid, stearic acid, linoleic acid, oleic acid, chloroacetic acid, and fluoroacetic acid.

Examples of the dehydrating agents include a silicate-based dehydrating agent, an isocyanate-based dehydrating agent, an ortho ester-based dehydrating agent, and an inorganic dehydrating agent. More specific examples thereof include methyl orthoformate, ethyl orthoformate, methyl orthoacetate, orthoboric acid ester, tetraethyl orthosilicate, anhydrous gypsum, calcined gypsum, and synthetic zeolite (molecular sieve). Among these, a molecular sieve is particularly preferable.

These additives can be used alone or in combination of two or more kinds thereof. Examples of the combination of two or more kinds of the additives include a combination of the compound (Y) and the dehydrating agent, a combination of the compound (Y), the acidic compound, and the dehydrating agent, a combination of the compound (Y), the basic compound, the acidic compound, and the dehydrating agent, and a combination of the basic compound and the dehydrating agent.

In a case where the resin composition contains the compound (Y), the content of the compound (Y) in the resin composition is preferably 20% by mole or greater, more preferably in a range of 30% to 1000% by mole, and still more preferably in a range of 40% to 800% by mole with respect to the amount of the structure (I) in the copolymer (X). In a case where the content of the compound (Y) is in the above-described range, the effect of improving the storage stability is further improved.

In a case where the resin composition contains a basic compound and/or an acidic compound, from the viewpoint of the storage stability, as the content of the basic compound and/or the acidic compound in the resin composition, the amount of the basic compound with a concentration set such that the pH to be measured in water is in a range of 2 to 12 is preferable and the amount of the basic compound with a concentration set such that the pH is in a range of 6 to 9 is more preferable.

Here, specifically, the pH to be measured in water indicates a value to be measured by adding the basic compound in water. The pH indicates a value at 23° C.

In a case where the resin composition contains a dehydrating agent, the content of the dehydrating agent in the resin composition is preferably in a range of 0.1% to 40% by mass and more preferably in a range of 1% to 20% by mass with respect to the total mass of the resin composition. In a case where the content of the dehydrating agent is greater than or equal to the above-described lower limit, the storage stability is further improved. In a case where the content of the dehydrating agent is less than or equal to the above-described upper limit, the dissolution stability is further improved.

The resin composition of the present invention may further contain a silicone oil. In a case where the resin composition contains a silicone oil, the antifouling properties of a coating film are excellent.

Examples of the silicone oil include a straight silicone oil such as dimethyl silicone oil, methyl phenyl silicone oil, or methyl hydrogen silicone oil, and a modified silicone oil. A modified silicone oil indicates a silicone oil in which an organic group (hereinafter, also referred to as a "modification group") other than a methyl group and a phenyl group is introduced into some silicon atoms of a straight silicone oil. Examples of the modification group include a chlorophenyl group, a methylstyrene group, a long-chain alkyl group (for example, an alkyl group having 2 to 18 carbon atoms), a polyether group, a carbinol group, an aminoalkyl group, an epoxy group, and a (meth)acryloyl group. These silicone oils may be used alone or in combination of two or more kinds thereof.

As the silicone oil, commercially available products can be used. Examples of the commercially available silicone oil include "KF-96", "KF-50", "KF-54", "KF-56", and "KF-6016" (all manufactured by Shin-Etsu Chemical Co., Ltd.), "TSF451" (manufactured by Momentive Performance Materials Inc.), "Fluid47" (manufactured by (France) Rhone-Poulenc), and "SH200", "SH510", "SH550", "SH710", "DC200", "ST-114PA", and "FZ209" (all manufactured by Dow Corning Toray Co., Ltd.).

It is preferable that the resin composition of the present invention contain an organic solvent. In a case where the resin composition contains an organic solvent, the coating suitability of the antifouling paint composition obtained by using the resin composition, the water resistance of a coating film to be formed, and the film forming properties are further improved.

The organic solvent is not particularly limited as long as the copolymer (X) can be dissolved in the organic solvent, and examples thereof include a hydrocarbon-based solvent such as toluene or xylene; an ether-based solvent such as the compound (Y) or propylene glycol monomethyl ether-2-acetate; a ketone-based solvent such as methyl isobutyl ketone; and an ester-based solvent such as n-butyl acetate. These can be used alone or in combination of two or more kinds thereof.

From the viewpoint of reducing the VOC content in the antifouling paint composition, the content of the organic solvent in the resin composition of the present invention is preferably 55% by mass or less, more preferably 50% by mass or less, and still more preferably 45% by mass or less with respect to the total amount of the resin composition.

The content of the organic solvent is preferably set to an amount such that the viscosity of the resin composition at 25° C. is less than or equal to the preferable upper limit described below and varies depending on the weight-average molecular weight of the copolymer (X), the glass transition temperature thereof, the presence of a crosslinked structure, and the like, but is preferably 15% by mass or greater and more preferably 20% by mass or greater.

Further, the compound (Y) can function as an organic solvent. Therefore, in a case where the resin composition contains the compound (Y), the content of the compound (Y) is included in the content of the organic solvent.

The resin composition of the present invention may further contain components other than the copolymer (X), the compound that reacts with an acid, the basic compound, the acidic compound, the dehydrating agent, the silicone oil, and the organic solvent.

Examples of other components are the same as those exemplified as other components in the antifouling paint composition described below.

The content of other components is preferably 200% by mass or less and may be 0% by mass with respect to the amount of the copolymer (X).

The solid content of the resin composition of the present invention is preferably 45% by mass or greater, more preferably 50% by mass or greater, and still more preferably 55% by mass or greater. In a case where the solid content of the resin composition is greater than or equal to the above-described lower limit, the VOC content of the antifouling paint composition is sufficiently decreased.

The upper limit of the solid content of the resin composition is not particularly limited and may be 100% by mass.

In a case where the resin composition contains an organic solvent, from the viewpoint of the viscosity of the resin composition, the content thereof is preferably 85% by mass or less and more preferably 80% by mass or less.

The solid content of the resin composition is measured using the measuring method described in the examples below.

In a case where the resin composition of the present invention contains an organic solvent, the viscosity of the resin composition to be measured at 25° C. using a B type viscometer (hereinafter, also referred to as a "B type viscosity") is preferably less than 5000 mPa·s, more preferably less than 3000 mPa·s, still more preferably less than 2000 mPa·s, and particularly preferably less than 1000 mPa·s.

The viscosity of the resin composition to be measured at 25° C. using a Gardner bubble viscometer (hereinafter, also referred to as a "Gardner viscosity") is preferably Z3 or less and more preferably V or less.

In a case where the viscosity (the B type viscosity or the Gardner viscosity) of the resin composition is less than or equal to the above-described upper limit, a solvent does not need to be added to the resin composition in order to dilute the resin composition, and an antifouling agent or the like can be blended or applied thereto so that an antifouling paint composition with a small VOC content can be obtained.

It is preferable that the viscosity of the resin composition in a case where the solid content thereof is at least 50% by mass be lower than or equal to the above-described preferable upper limit.

The lower limit of the viscosity of the resin composition is not particularly limited. From the viewpoint of suppressing sagging of the paint at the time of application, the B type viscosity at 25° C. is preferably 100 mPa·s or greater.

Therefore, the B type viscosity of the resin composition at 25° C. is preferably 100 mPa·s or greater and less than 5000 mPa·s, more preferably 100 mPa·s or greater and less than 3000 mPa·s, still more preferably 100 mPa·s or greater and less than 2000 mPa·s, and particularly preferably 100 mPa·s or greater and less than 1000 mPa·s.

The viscosity of the resin composition can be adjusted depending on the solid content of the resin composition (the content of the copolymer (X) and other components), the weight-average molecular weight of the copolymer (X), the glass transition temperature, and the presence of the cross-linked structure. For example, the viscosity tends to be lowered as the solid content, particularly the content of the copolymer(X), decreases. In addition, the viscosity tends to be lowered as the weight-average molecular weight of the copolymer (X) decreases or the glass transition temperature decreases.

<Decomposition Rate of Structure (I)>

In a case where the copolymer (X) has the constituent unit (A1), the decomposition rate of the structure (I) in the copolymer (X) after storage of the resin composition at 40° C. for 30 days in the resin composition of the present invention is preferably 20% or less, more preferably 7% or less, still more preferably 4% or less, particularly preferably 3% or less, and most preferably 2% or less. In a case where the decomposition rate of the structure (I) after storage of the resin composition at 40° C. for 30 days is less than or equal to the above-described upper limit, the storage stability of the resin composition and the antifouling paint composition is further improved. Further, in a case where the resin composition contains an organic solvent, the stability of dissolution of the copolymer (X) in an organic solvent is excellent. It is preferable that the decomposition rate thereof decrease, and the lower limit thereof may be 0%.

The decomposition rate of the structure (I) after storage of the resin composition at 40° C. for 30 days can be lowered to 20% or less by allowing the resin composition to contain the compound that reacts with an acid, the basic compound, the acidic compound, and the dehydrating agent.

In the measurement of the decomposition rate of the structure (I), the storage of the resin composition is carried out by adding the resin composition to a glass bottle, sealing the bottle, and allowing the bottle to stand in a drying container under a shielded environment.

The decomposition rate of the structure (I) is defined as the following value obtained by subtracting a theoretical solid acid value (b), at the time of the structure (I) contained in the copolymer (X) which is not completely decomposed, from a measured solid acid value (a) of the resin composition (after storage at 40° C. for 30 days) and dividing the obtained value by a theoretical solid acid value (c) at the time of the structure (I) contained in the copolymer (X) which is completely decomposed.

(Decomposition rate)={(measured solid acid value (a))−(theoretical solid acid value (b))}/(theoretical solid acid value (c))×100

The measured solid acid value will be described in the item of the solid acid value in the examples described below.

The theoretical solid acid value can be calculated according to the following equation.

(Theoretical solid acid value)=Σ(561×100/Mw$_i$×w$_i$)

In the calculation formula of the theoretical solid acid value, w$_i$ represents a mass fraction of a monomer i containing an acid functional group among the monomers constituting the copolymer (X), and Mw$_i$ represents a molecular weight of the monomer containing an acid functional group. The acid functional group is a functional group of a carboxylic acid or the like.

The acid value after decomposition is calculated by regarding the monomer as a monomer that contains an acid functional group.

The acid value before decomposition is calculated by regarding the monomer as a monomer that does not contain an acid functional group.

(Method of Producing Resin Composition)

The resin composition of the present invention can be produced using a known method. For example, a resin composition can be prepared by producing the copolymer (X) according to the production method (α) or (β) described above and blending the compound that reacts with an acid, the basic compound, the acidic compound, the dehydrating agent, the silicone oil, the organic solvent, other components, and the like into the obtained copolymer (X) as necessary.

In a case where the resin composition contains the compound (Y), the timing for blending the compound (Y) may be simultaneous with the production of the copolymer (X) or after the production of the copolymer (X) and is not particularly limited. For example, according to the production method (α), the compound (Y) may coexist at the time of polymerization of the monomer mixture or the compound (Y) may be added after completion of the polymerization. According to the production method (β), after completion of the polymerization of the monomer mixture, a larger amount of the compound (Y) may be added to the carboxy group of the copolymer (XO) so that the unreacted compound (Y) remains at the time of reacting the compound (Y) with the generated copolymer (XO) to obtain the copolymer (X). Since a part of the compound (Y) is radically polymerized in a case where the compound (Y) is allowed to coexist during the polymerization reaction, a method of adding the compound (Y) after completion of the polymerization is preferable.

A raw material containing a silicone oil may be used as the raw material of the polymerizable monomer (b) or the like. In this case, the polymerization product contains the copolymer (X) and the silicone oil.

The resin composition of the present invention can be formed into an antifouling paint composition as it is or by being mixed with an antifouling agent and the like as necessary.

The resin composition of the present invention can be used as an antifogging paint composition or the like in addition to the antifouling paint composition.

Since the coating film obtained by using the resin composition of the present invention exhibits an excellent antifouling effect in sea water or the like, the resin composition of the present invention is suitable for the antifouling paint composition.

[Antifouling Paint Composition]

The antifouling paint composition of the present invention contains the resin composition of the present invention described above. Therefore, the antifouling paint composition contains the copolymer (X).

From the viewpoint of the storage stability of the antifouling paint composition, the antifouling paint composition according to the present embodiment may further contain at least one selected from the group consisting of a compound that reacts with an acid, a basic compound, an acidic compound, and a dehydrating agent. Examples of the compound that reacts with an acid, the basic compound, the acidic compound, and the dehydrating agent are the same as those described above. The preferable contents are the same as described above.

From the viewpoint of the antifouling properties of the coating film, the antifouling paint composition according to the present embodiment may further contain a silicone oil.

Examples of the silicone oil are the same as those described above.

The antifouling paint composition according to the present embodiment may contain an organic solvent.

Examples of the organic solvent are the same as those described above.

The antifouling paint composition according to the present embodiment may further contain an antifouling agent.

The antifouling paint composition according to the present embodiment may further contain components other than the copolymer (X), the compound that reacts with an acid, the basic compound, the acidic compound, the dehydrating agent, the silicone oil, the organic solvent, and the antifouling agent.

In a case where the antifouling paint composition contains the compound that reacts with an acid, the basic compound, the acidic compound, the dehydrating agent, the silicone oil, the organic solvent, and other components, these components may be derived from the resin composition, may not be derived from the resin composition (those which are blended at the time of preparation of the antifouling paint composition), or may be a mixture of these.

<Antifouling Agent>

Examples of the antifouling agent include inorganic antifouling agents and organic antifouling agents, and one or more kinds can be appropriately selected depending on the required performance and used.

Examples of the antifouling agent include a copper-based antifouling agent such as cuprous oxide, copper thiocyanate, or copper powder, compounds of other metals (lead, zinc, nickel, and the like), an amine derivative such as diphenylamine, a nitrile compound, a benzothiazole-based compound, a maleimide-based compound, and a pyridine-based compound. These may be used alone or in combination of two or more kinds thereof.

More specific examples of the antifouling agent include 4-bromo-2-(4-chlorophenyl)-5-(trifluoromethyl)-1H-pyrrole-3-carbonitrile, manganese ethylene bisdithiocarbamate, zinc dimethyl dithiocarbamate, 2-methylthio-4-t-butylamino-6-cyclopropylamino-s-triamine, 2,4,5,6-tetrachloroisophthalonitrile, N,N-dimethyldichlorophenylurea, zinc ethylene bisdithiocarbamate, copper rhodanide, 4,5-dichloro-2-n-octyl-3(2H)isothiazolone, N-(fluorodichloromethylthio)phthalimide, N,N'-dimethyl-N'-phenyl-(N-fluorodichloromethylthio)sulfamide, 2-pyridinethiol-1-oxide zinc salt, tetramethylthiuram disulfide, a Cu-10% Ni solid solution alloy, 2,4,6-trichlorophenylmaleimide 2,3,5,6-tetrachloro-4-(methylsulfonyl)pyridine, 3-iodo-2-propynyl butyl carbamate, diiodomethyl paratolyl sulfone, bisdimethyl dithiocarbamoyl zinc ethylene bisdithiocarbamate, phenyl (bispyridyl)bismuth dichloride, 2-(4-thiazolyl)-benzoimidazole, medetomidine, and pyridine triphenyl borane.

In a case where the antifouling paint composition contains an antifouling agent, the content of the antifouling agent in the antifouling paint composition is not particularly limited, but is preferably in a range of 2 to 200 parts by mass and more preferably in a range of 10 to 150 parts by mass with respect to 100 parts by mass of the copolymer (X). In a case where the content of the antifouling agent is greater than or equal to the above-described lower limit, the antifouling effect of a coating film to be formed is excellent. In a case where the content of the antifouling agent is less than or equal to the upper limit of the above-described upper limit, the physical properties of the coating film are excellent.

<Other Components>

As other components, resins other than the copolymer (X) may be exemplified. Other resins are resins that do not have at least one of the constituent unit (A), the constituent unit (B), and the constituent unit (C). Examples of other resins include thermoplastic resins.

It is preferable that the antifouling paint composition of the present invention contain a thermoplastic resin other than the copolymer (X). In a case where the antifouling paint composition contains a thermoplastic resin other than the copolymer (X), the physical properties of the coating film such as crack resistance and water resistance are improved.

Examples of the thermoplastic resin other than the copolymer (X) include chlorinated paraffin; chlorinated polyolefin such as chlorinated rubber, chlorinated polyethylene, or chlorinated polypropylene; polyvinyl ether; polypropylene sebacate; partially hydrogenated terphenyl; polyvinyl acetate; poly(meth)acrylic acid alkyl ester such as a methyl (meth)acrylate-based copolymer, an ethyl (meth)acrylate-based copolymer, a propyl (meth)acrylate-based copolymer, a butyl (meth)acrylate-based copolymer, or a cyclohexyl (meth)acrylate-based copolymer; a polyether polyol; an alkyd resin; a polyester resin; a vinyl chloride-based resin such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, or a vinyl chloride-ethyl vinyl ether copolymer; waxes; fats and oils in a solid state at room temperature other than waxes; fats and oils in a liquid state at room temperature such as castor oil and refined products thereof; petroleum jelly; liquid paraffin; and rosin, hydrogenated rosin, naphthenic acid, fatty acids, and divalent metal salts of these. Examples of the waxes include waxes derived from animals such as beeswax; waxes derived from plants; semi-synthetic waxes such as amide-based waxes; and synthetic waxes such as polyethylene oxide-based waxes. These thermoplastic resins may be used alone or in combination of two or more kinds thereof.

The content of the thermoplastic resin other than the copolymer (X) in the antifouling paint composition is not particularly limited, but is preferably in a range of 0.1 to 50 parts by mass and more preferably in a range of 0.1 to 10 parts by mass with respect to 100 parts by mass of the copolymer (X). In a case where the content of the thermoplastic resin other than the copolymer (X) is greater than or equal to the above-described lower limit, the physical properties of the coating film such as crack resistance or water resistance are excellent. In a case where the content thereof is less than or equal to the above-described upper limit, the hydrolyzability is excellent.

For the purpose of imparting lubricity to the surface of the coating film and preventing adhesion of organisms, the antifouling paint composition of the present invention may contain a silicon compound such as dimethylpolysiloxane or a silicone oil, a fluorine-containing compound such as fluorinated hydrocarbon, or the like.

The antifouling paint composition of the present invention may contain various pigments, antifoaming agents, leveling agents, pigment dispersants (such as antisettling agents), antisagging agents, matting agents, ultraviolet absorbing agents, antioxidants, heat resistance improvers, slipping agents, preservatives, plasticizers, and viscosity control agents.

Examples of the pigments include zinc oxide, talc, silica, barium sulfate, potassium feldspar, aluminum hydroxide, magnesium carbonate, mica, carbon black, red iron oxide, titanium oxide, phthalocyanine blue, kaolin, and gypsum.

Examples of the antisettling agent and the antisagging agent other than the thermoplastic resin include a bentonite-based agent, a fine powder silica-based agent, a stearate salt, a lecithin salt, and an alkyl sulfonate.

Examples of the plasticizer other than the thermoplastic resin include a phthalic acid ester-based plasticizer such as dioctyl phthalate, dimethyl phthalate, dicyclohexyl phthalate, or diisodecyl phthalate; an aliphatic dibasic acid ester-based plasticizer such as isobutyl adipate or dibutyl sebacate; a glycol ester-based plasticizer such as diethylene glycol dibenzoate or pentaerythritol alkyl ester; a phosphoric acid ester-based plasticizer such as tricresyl phosphate (TCP), triaryl phosphate, or trichloroethl phosphate; an epoxy-based plasticizer such as epoxy soybean oil or octyl epoxy stearate; an organic tin plasticizer such as dioctyl tin laurate or dibutyl tin laurate; and trioctyl trimellitate, and triacetylene. In a case where the antifouling paint composition contains a plasticizer, the crack resistance and the peeling resistance of the coating film can be improved.

<Various Characteristics of Antifouling Paint Composition>

The VOC content of the antifouling paint composition according to the present invention is preferably 450 g/L or less, more preferably 420 g/L or less, and still more preferably 400 g/L or less.

The VOC content is calculated according to the following equation using the specific gravity and the solid content value of the antifouling paint composition.

$$\text{VOC content (g/L)} = \text{specific gravity of composition} \times 1000 \times (100 - \text{solid content})/100$$

The specific gravity of the antifouling paint composition is calculated by filling a specific gravity cup having a volume of 100 mL with the antifouling paint composition at 25° C. and measuring the mass thereof. The solid content (heating residue) of the antifouling paint composition is measured according to the method described in the examples below.

The VOC content can be adjusted depending on the content of the organic solvent.

The VOC content can be decreased by increasing the solid content of the resin composition for an antifouling paint even in a case where the viscosity of the antifouling paint is the same.

The solid content of the antifouling paint composition of the present invention is preferably in a range of 50% to 100% by mass, more preferably in a range of 55% to 90% by mass, and still more preferably in a range of 60% to 80% by mass.

In a case where the solid content of the antifouling paint composition is greater than or equal to the above-described lower limit, the VOC content is sufficiently decreased. In a case where the solid content is less than or equal to the above-described upper limit, the viscosity of the antifouling paint composition is easily lowered.

The viscosity of the antifouling paint composition of the present invention to be measured at 25° C. using a B type viscometer is preferably less than 10000 mPa·s, more preferably less than 7000 mPa·s, and still more preferably less than 5000 mPa·s. In a case where the viscosity of the antifouling paint composition is less than or equal to the above-described upper limit, the antifouling paint composition is easily applied.

The lower limit of the viscosity of the antifouling paint composition is not particularly limited, but is preferably 100 mPa·s or greater from the viewpoint of the physical properties of the coating film.

The viscosity of the antifouling paint composition can be adjusted depending on the viscosity of the resin composition, the amount of the solvent to be added to the resin composition, and the like.

The antifouling paint composition of the present invention can be prepared by preparing the resin composition of the present invention, adding an antifouling agent, other components, and an organic solvent as necessary, and mixing the solution.

The antifouling paint composition of the present invention can be used for forming a coating film (antifouling coating film) on a surface of a base material, for example, underwater structures such as ships, various fishing nets, port facilities, oil fences, bridges, and submarine bases.

The coating film formed of the antifouling paint composition of the present invention can be formed on a surface of a base material directly or through a ground coating film.

As the ground coating film, a wash primer, a chlorinated rubber-based primer, or an epoxy-based primer, or an intermediate paint can be used for forming the coating film.

The coating film can be formed using a known method. For example, the surface of the base material or the ground coating film on the base material is coated with the antifouling paint composition by means of brush coating, spray coating, roller coating, or dip coating and dried, thereby forming a coating film.

The coating amount of the antifouling paint composition can be typically set such that the thickness of the dried coating film is in a range of 10 to 400 μm.

The coating film can be typically dried at room temperature and may be dried by being heated as necessary.

EXAMPLES

Hereinafter, the present invention will be described in more detail based on examples and comparative examples, but the present invention is not limited to these examples. Further, parts in the examples indicate parts by mass.

The evaluation methods used in the examples are described below.

<Evaluation Method>

(Weight-average molecular weight (Mw) and number-average molecular weight (Mn) of macromonomer)

The measurement was performed using gel permeation chromatography (GPC) (HLC-8320, manufactured by Tosoh Corporation). A tetrahydrofuran solution was prepared such that the concentration of the macromonomer was set to 0.2% by mass, 10 µl of the solution was injected into a device on which columns (TSKgel SuperHZM-M×HZM-M×HZ2000 and TSKguardcolumn SuperHZ-L, manufactured by Tosoh Corporation) were mounted, and the measurement was carried out under conditions of a column temperature of 40° C. at a flow rate of 0.35 ml/min using tetrahydrofuran (stabilizer BHT) as an eluent. The weight-average molecular weight (Mw) or the number-average molecular weight (Mn) was calculated in terms of standard polystyrene.

(Weight-average molecular weight (Mw), number-average molecular weight (Mn), and molecular weight distribution (Mw/Mn) of copolymer)

The measurement was performed using gel permeation chromatography (GPC) (HLC-8320, manufactured by Tosoh Corporation). A tetrahydrofuran solution was prepared such that the concentration of the (meth)acrylic copolymer was set to 0.4% by mass, 100 µl of the solution was injected into a device on which columns (TSKgelG4000HXL*G2000HXL (manufactured by Tosoh Corporation, 7.8 mm×30 cm) and TSKguardcolumn HXL-L (manufactured by Tosoh Corporation, 6.0 mm×4 cm)) were mounted, and the measurement was carried out under a condition of a column temperature of 40° C. The weight-average molecular weight (Mw) or the number-average molecular weight (Mn) was calculated in terms of standard polystyrene. The molecular weight distribution (Mw/Mn) was calculated from the calculated Mw and Mn.

(Viscosity)

A sample (resin composition) was put into a dried viscosity tube (Gardner bubble viscosity tube) up to an indication line of the viscosity tube, and the tube was sealed with a cork stopper. The viscosity tube with the collected sample was vertically immersed in a constant temperature water bath the temperature of which was adjusted to a predetermined temperature (25.0±0.1° C.) for 2 hours so that the temperature of the sample was constant, a viscosity tube serving as a reference tube and the viscosity tube to which the sample was added were allowed to rotate by 180° simultaneously, and the viscosity (Gardner viscosity) was determined by comparing the bubble increase rate of the sample in the viscosity tube with that in the reference tube.

(Solid Content (Heating Residue))

0.50 g of a sample (resin composition) was measured using an aluminum dish, 3 mL of toluene was added thereto using a syringe such that the sample was evenly spread over on the bottom of the dish, and preliminary drying was performed. The preliminary drying is a treatment for easily evaporating a solvent during the main drying by spreading the measurement sample over the entire dish. In the preliminary drying, the measurement sample and toluene were heated and dissolved in a water bath at 70° C. to 80° C. so as to be evaporated and dried. After the preliminary drying, the main drying was performed using a hot air dryer at 105° C. for 2 hours. The solid content (heating residue) was acquired using the following equation based on the mass (mass before drying) of the measurement sample before the preliminary drying and the mass (mass after drying) of the measurement sample after the main drying.

Solid content (% by mass)=mass after drying/mass before drying×100

(Consumption Degree)

A hard vinyl chloride plate having a size of 50 mm×50 mm×2 mm (thickness) was coated with the sample (antifouling paint composition) using an applicator such that the thickness of the dried film was set to 120 µm, and the film was dried to form a coating film, thereby obtaining a test plate. This test plate was attached to a rotating drum installed in artificial seawater, the rotating drum was allowed to rotate at a circumferential speed of 7.7 m/s (15 knots), the film thickness of the coating film was measured after 6 months, and the consumed film thickness (µm/M) per month was calculated from the measured film thickness {=(120—measured film thickness (µm))/6}. The consumption degree is preferably in a range of 1 to 150 µm/M.

(Hardness of Coating Film)

A glass substrate was coated with the sample (resin composition) using a 500 µm applicator such that the thickness of the dried film was set to be in a range of 80 to 150 µm, and the film was dried at 25° C. for 1 week, thereby obtaining a test plate on which a coating film of the sample was formed. The hardness (Martens hardness) of the coating film of the test plate was measured at 25° C. using a micro hardness meter (trade name: HM2000, manufactured by Fischer Instruments K.K.).

The measurement was performed under conditions in which dQRST (F)/dt was set to be constant, F (test force) was set to 10 mN/10 sec, C (maximum load creep time) was set to 5 seconds, the maximum indentation load was set to 10 mN, and the maximum indentation depth was set to 6 µm. The hardnesses (Martens hardness) were measured at three different sites of the coating film of the test plate, and the average value of these measured values was set as the hardness of the coating film.

Further, the Martens hardness is preferably in a range of 3.0 to 40.0 N/mm$^2$ and more preferably in a range of 4.0 to 20.0 N/mm$^2$. In a case where the Martens hardness is 3.0 N/mm$^2$ or greater, the hardness of the coating film is sufficiently high. In a case where the Martens hardness is 40.0 N/mm$^2$ or less, the crack resistance of the coating film is improved.

(Antifouling Property)

A sandblasted plate coated with a rust-proof paint in advance was coated with a sample (the resin composition or the antifouling paint composition) such that the thickness of the dried film was set to 200 µm, thereby preparing a test plate. The coating film was allowed to stand in the bay of Aichi Prefecture and be immersed for 3 months, and the attachment area (the proportion of the area where organisms are attached in the total area of the coating film) of the attached organisms was examined. The antifouling properties were evaluated based on the following criteria.

A (excellent): The attachment area was less than 5%.

B (good): The attachment area was 5% or greater and less than 20%.

C (acceptable): The attachment area was 20% or greater and less than 40%.

D (poor): The attachment area was 40% or greater.

Production Example 1

Production of Metal Atom-Containing Polymerizable Monomer Mixture (MM-Zn1)

A reaction container provided with a stirrer, a temperature adjuster, and a dropping funnel was charged with 85.4 parts of propylene glycol methyl ether (PGM) and 40.7 parts of zinc oxide, and the mixture was heated to 75° C. while being stirred. Next, a mixture formed of 43.1 parts of methacrylic acid, 36.1 parts of acrylic acid, and 5 parts of water was added dropwise from the dropping funnel at a constant speed for 3 hours. After the mixture was stirred for 2 hours, 36 parts of PGM was added thereto, thereby obtaining a transparent metal atom-containing polymerizable monomer mixture (MM-Zn1) having a solid content of 44.8% by mass.

Production Example 2

Production of Metal Atom-Containing Polymerizable Monomer Mixture (MM-Zn2)

A four-necked flask provided with a cooler, a thermometer, a dropping funnel, and a stirrer was charged with 72.4 parts of PGM and 40.7 parts of zinc oxide, and the mixture was heated to 75° C. while being stirred. Next, a mixture formed of 30.1 parts of methacrylic acid, 25.2 parts of acrylic acid, and 51.6 parts of versatic acid was added dropwise from the dropping funnel at a constant speed for 3 hours. After the mixture was stirred for 2 hours, 11 parts of PGM was added thereto, thereby obtaining a transparent metal atom-containing polymerizable monomer mixture (MM-Zn2) having a solid content of 59.6% by mass.

Production Example 3

Production of Dispersant 1

900 parts by deionized water, 60 parts of sodium 2-sulfoethyl methacrylate, 10 parts of potassium methacrylate, and 12 parts of methyl methacrylate (MMA) were put into a polymerization device provided with a stirrer, a cooling pipe, and a thermometer, and the mixture was stirred and heated to 50° C. while replacing the inside of the polymerization device with nitrogen. 0.08 parts of 2,2'-azobis(2-methylpropionamidine) dihydrochloride was added thereto as a polymerization initiator, and the mixture was further heated to 60° C. After the mixture was heated, MMA was continuously added dropwise thereto at a rate of 0.24 parts/min for 75 minutes using a dropping pump. The reaction solution was held at 60° C. for 6 hours and cooled to room temperature, thereby obtaining a dispersant 1 having a solid content of 10% by mass which was a transparent aqueous solution.

Production Example 4

Production of Chain Transfer Agent 1

1.00 g of cobalt acetate (II) tetrahydrate, 1.93 g of diphenyl glyoxime, and 80 ml of diethyl ether which had been deoxygenated by nitrogen bubbling in advance were put into a synthesizer provided with a stirrer, and the mixture was stirred at room temperature for 30 minutes. Next, 10 ml of a boron trifluoride diethyl ether complex was added thereto, and the mixture was further stirred for 6 hours. The mixture was filtered, and the solid was washed with diethyl ether and dried in a vacuum for 15 hours, thereby obtaining 2.12 g of a chain transfer agent 1 in the form of a reddish brown solid.

Production Example 5

Production of Macromonomer 1

145 g of deionized water, 0.1 parts of sodium sulfate, and 0.25 parts of the dispersant 1 (solid content of 10% by mass) were put into a polymerization device provided with a stirrer, a cooling pipe, and a thermometer, and the mixture was stirred to obtain a uniform aqueous solution. Next, 100 parts of MMA, 0.004 parts of the chain transfer agent 1, and 0.40 parts of 1,1,3,3-tetramethylbutyl peroxy 2-ethylhexanoate (PEROCTA 0 (registered trademark), manufactured by NOF Corporation) was added thereto to obtain an aqueous suspension.

Thereafter, the inside of the polymerization device was replaced with nitrogen, heated to 80° C. for the reaction for 1 hour, and heated to 90° C., and the state was held for 1 hour in order to increase the polymerization rate. Next, the reaction solution was cooled to 40° C. to obtain an aqueous suspension containing a polymer. This aqueous suspension was filtered using nylon filter cloth having a pore size of 45 μm, and the filtrate was washed with deionized water and dehydrated, and dried at 40° C. for 16 hours, thereby obtaining a macromonomer (1). The number-average molecular weight of the macromonomer 1 was 3,000 and the weight-average molecular weight thereof was 7,000.

Production Example 6

Production of Macromonomer 2

145 g of deionized water, 0.1 parts of sodium sulfate, and 0.25 parts of the dispersant 1 (solid content of 10% by mass) were put into a polymerization device provided with a stirrer, a cooling pipe, and a thermometer, and the mixture was stirred to obtain a uniform aqueous solution. Next, 75 parts of MMA, 25 parts of 2-methoxyethyl methacrylate (2-MTMA), 0.010 parts of a chain transfer agent 1, and 1.50 parts of 1,1,3,3-tetramethylbutyl peroxy 2-ethylhexanoate (PEROCTA O, manufactured by NOF Corporation) was added thereto to obtain an aqueous suspension.

Thereafter, the inside of the polymerization device was replaced with nitrogen, heated to 80° C. for the reaction for 1 hour, and heated to 90° C., and the state was held for 1 hour in order to increase the polymerization. Next, the reaction solution was cooled to 40° C. to obtain an aqueous suspension containing a polymer. This aqueous suspension was filtered using nylon filter cloth having a pore size of 45 μm, and the filtrate was washed with deionized water and dehydrated, and dried at 40° C. for 16 hours, thereby obtaining a macromonomer 2. The number-average molecular weight of the macromonomer 2 was 2000 and the weight-average molecular weight thereof was 3800.

Production Example 7

Production of Macromonomer 3

A resin composition was produced in the same manner as in Example 1 except that the type and the amount (parts) of the macromonomer to be charged into a reaction container and the composition of the mixture to be added dropwise after the temperature was increased were changed to those as listed in Table 1.

TABLE 1

|  |  | Macromonomer 1 | Macromonomer 2 | Macromonomer 3 |
|---|---|---|---|---|
| Monomer (parts) | MMA | 100 | 75 | 100 |
|  | 2-MTMA | — | 25 | — |
| Chain transfer agent (parts) | Chain transfer agent 1 | 0.004 | 0.010 | 0.008 |
| Initiator (parts) | PEROCTA O | 0.40 | 1.50 | 0.80 |
| Weight-average molecular weight (Mw) |  | 7000 | 3800 | 3000 |
| Number-average molecular weight (Mn) |  | 3000 | 2000 | 1600 |

Production Example 7

90.1 parts (0.9 mol) of isobutyl vinyl ether, 0.14 parts of hydroquinone, and 0.28 parts of phenothiazine were stirred at room temperature and mixed to obtain a uniform solution. 51.7 parts (0.6 mol) of methacrylic acid was added dropwise while air (10 ml/min) was blown such that the temperature of the reaction solution was maintained at 60° C. or lower. After dropwise addition, the temperature of the reaction solution was increased to 80° C. and the reaction was continued for 6 hours. 158.7 parts (1.8 mol) of t-butyl methyl ether was added to the reaction solution, the solution was mixed, and the organic phase was washed once using 200 parts of a 20 mass % potassium carbonate aqueous solution. 0.03 parts of 4-benzoyloxy-2,2,6,6-tetramethylpiperidine-N-oxyl was added to the organic phase so that the low boiling content was distilled off using an evaporator. The resulting residue was distilled off under reduced pressure, thereby obtaining 97.5 (0.52 mol) of 1-isobutoxyethyl methacrylate (IBEMA) having a boiling point of 60° C./3 torr.

Example 1

A reaction container provided with a stirrer, a temperature adjuster, and a dropping funnel was charged with 34 parts of xylene, 15 parts of PGM, 4 parts of EA, and 18.5 parts of the macromonomer 1, and the mixture was heated to 100° C. while being stirred. Next, a mixture formed of 51.8 parts of ethyl acrylate (EA), 21.6 parts of the metal atom-containing polymerizable monomer mixture (MM-Zn1), 20 parts of a polysiloxane block-containing polymerizable monomer (FM-0711, manufactured by JNC Corporation), 0.5 parts of 2,2-azobis(isobutyronitrile) (AIBN), 0.7 parts of 2,2-azobis(2-methylbutyronitrile) (AMBN), 1.2 parts of a chain transfer agent (NOFMER (registered trademark) MSD, manufactured by NOF Corporation, α-methylstyrene dimer), and 5 parts of xylene was added dropwise from the dropping funnel at a constant speed for 6 hours.

After the dropwise addition, 3 parts of xylene was added thereto, 0.5 parts of t-butyl peroxy octoate and 4 parts of xylene were added dropwise four times at intervals of 30 minutes, the resulting solution was further stirred for 1 hour, and 8 parts of xylene was added thereto to obtain a solution-like resin composition having a solid content of 56.0% by mass and a viscosity of ST.

Examples 2 to 5 and Comparative Examples 1 and 2

Each resin composition was produced in the same manner as in Example 1 except that the type and the amount (parts) of the macromonomer to be charged into a reaction container and the composition of the mixture to be added dropwise after the temperature was increased were changed to those as listed in Tables 2 and 4.

Example 6

A reaction container provided with a stirrer, a temperature adjuster, and a dropping funnel was charged with 50 parts of xylene and 20 parts of a macromonomer, and the mixture was heated to 90° C. while being stirred. Next, a mixture formed of 25 parts of IBEMA, 20 parts of FM-0711 (trade name, manufactured by JNC Corporation), 35 parts of ethyl acrylate, and 0.5 parts of AMBN was added dropwise from the dropping funnel at a constant speed for 4 hours. After the dropwise addition, 2.0 parts of AMBN and 4.0 parts of xylene were added thereto at a constant speed for 30 minutes, the resulting solution was further stirred for 2 hours, and 6.7 parts of isobutyl vinyl ether and 3 parts of butyl acetate were added thereto to obtain a polymer solution (resin composition) A-6 having a solid content of 61.0% by mass and a Gardner viscosity of +J.

Example 7 and Comparative Examples 3 and 4

Each resin composition was produced in the same manner as in Example 6 except that the type and the amount (parts) of the macromonomer to be charged into a reaction container and the composition of the mixture to be added dropwise after the temperature was increased were changed to those as listed in Tables 2 and 4.

Examples 8 to 26, 31, and 32

Each resin composition was produced in the same manner as in Example 1 except that the type and the amount (parts) of the macromonomer to be charged into a reaction container and the composition of the mixture to be added dropwise after the temperature was increased were changed to those as listed in Tables 2 to 4.

Examples 27 and 28

Each resin composition was produced in the same manner as in Example 6 except that the type and the amount (parts) of the macromonomer to be charged into a reaction container and the composition of the mixture to be added dropwise after the temperature was increased were changed to those as listed in Table 4.

Examples 29 and 30

A resin composition was produced in the same manner as in Example 7 except that the type and the amount (parts) of the macromonomer to be charged into a reaction container and the composition of the mixture to be added dropwise after the temperature was increased were changed to those as listed in Table 4.

The characteristics (the viscosity and the solid content (% by mass)) of each resin composition obtained in Examples 1 to 32 and Comparative Examples 1 to 4, the characteristics (the number-average molecular weight (Mn), the weight-average molecular weight (Mw), and the molecular weight distribution) of the copolymer contained in each resin composition, and the evaluation results (the hardness of the coating film) are listed in Tables 2 to 4.

TABLE 2

|  |  | Example 1 | Example 2 | Example 3 | Example 4 | Example 5 | Example 6 |
|---|---|---|---|---|---|---|---|
| Resin composition |  | A-1 | A-2 | A-3 | A-4 | A-5 | A-6 |
| Monomer to be charged (parts) | Macromonomer 1 (Mn of 3000) | 18.5 | 13 | 13 | 0 | 0 | 0 |
|  | Macromonomer 2 (Mn of 2000) | 0 | 0 | 0 | 13 | 13 | 20 |
|  | Macromonomer 3 (Mn of 1600) | 0 | 0 | 0 | 0 | 0 | 0 |
|  | AA-6 | 0 | 0 | 0 | 0 | 0 | 0 |
| Composition of mixture (parts) | MMA | 0 | 0 | 0 | 0 | 0 | 0 |
|  | EA | 51.8 | 32.9 | 35.2 | 27.3 | 52.9 | 35 |
|  | CHMA | 0 | 0 | 0 | 0 | 0 | 0 |
|  | BA | 0 | 0 | 0 | 0 | 0 | 0 |
|  | MTA | 0 | 0 | 0 | 0 | 0 | 0 |
|  | MM-Zn1 (metal-containing monomer pure content) | 9.7 | 14.1 | 9.7 | 9.7 | 14.1 | 0 |
|  | MM-Zn2 (metal-containing monomer pure content) | 0 | 0 | 0 | 0 | 0 | 0 |
|  | IBEMA | 0 | 0 | 0 | 0 | 0 | 25 |
|  | TIPX | 0 | 0 | 0 | 0 | 0 | 0 |
|  | FM-0711 | 20 | 0 | 0 | 40 | 0 | 20 |
|  | X-24-8201 | 0 | 40 | 35 | 0 | 20 | 0 |
|  | FM-7721 | 0 | 0 | 5 | 0 | 0 | 0 |
|  | AIBN | 0.5 | 0.5 | 0.5 | 0.5 | 0.5 | 0 |
|  | AMBN | 0.7 | 0.7 | 3.0 | 1.5 | 0.7 | 0.5 |
|  | NOFMER MSD | 1.2 | 1.2 | 1.2 | 1.2 | 1.2 | — |
| Compound (Y) | Isobutyl vinyl ether | — | — | — | — | — | 6.7 |
| Weight-average molecular weight (Mw) |  | 8400 | 9100 | 9300 | 8200 | 8600 | 12000 |
| Number-average molecular weight (Mn) |  | 3000 | 3000 | 3000 | 3000 | 3100 | 7200 |
| Molecular weight distribution |  | 2.8 | 3.0 | 3.1 | 2.7 | 2.8 | 1.7 |
| Viscosity |  | ST | XY | Z | UV | Z1 | +J |
| Solid content (wt %) |  | 56.0 | 56.3 | 55.8 | 61.1 | 56.1 | 61 |
| Evaluation | Hardness of coating film (N/mm$^2$) | 7.2 | 8.3 | 8.1 | 7.4 | 7.1 | 8.6 |

|  |  | Example 7 | Example 8 | Example 9 | Example 10 | Example 11 |
|---|---|---|---|---|---|---|
| Resin composition |  | A-7 | A-12 | A-13 | A-14 | A-15 |
| Monomer to be charged (parts) | Macromonomer 1 (Mn of 3000) | 20 | 0 | 0 | 0 | 0 |
|  | Macromonomer 2 (Mn of 2000) | 0 | 0 | 0 | 0 | 0 |
|  | Macromonomer 3 (Mn of 1600) | 0 | 8 | 8 | 8 | 8 |
|  | AA-6 | 0 | 0 | 0 | 0 | 0 |
| Composition of mixture (parts) | MMA | 15 | 0 | 0 | 0 | 4.4 |
|  | EA | 20 | 37.9 | 57.9 | 67.9 | 57.9 |
|  | CHMA | 0 | 0 | 0 | 0 | 0 |
|  | BA | 0 | 0 | 0 | 0 | 0 |
|  | MTA | 0 | 0 | 0 | 0 | 0 |
|  | MM-Zn1 (metal-containing monomer pure content) | 0 | 14.1 | 14.1 | 14.1 | 9.7 |
|  | MM-Zn2 (metal-containing monomer pure content) | 0 | 0 | 0 | 0 | 0 |
|  | IBEMA | 0 | 0 | 0 | 0 | 0 |
|  | TIPX | 25 | 0 | 0 | 0 | 0 |
|  | FM-0711 | 0 | 40 | 20 | 10 | 20 |
|  | X-24-8201 | 20 | 0 | 0 | 0 | 0 |
|  | FM-7721 | 0 | 0 | 0 | 0 | 0 |
|  | AIBN | 0 | 0.5 | 0.5 | 0.5 | 0.5 |
|  | AMBN | 0.7 | 0.7 | 0.7 | 0.7 | 0.7 |
|  | NOFMER MSD | — | 1.2 | 1.2 | 1.2 | 1.2 |
| Compound (Y) | Isobutyl vinyl ether | — | — | — | — | — |
| Weight-average molecular weight (Mw) |  | 28000 | 9100 | 8100 | 7800 | 7700 |
| Number-average molecular weight (Mn) |  | 6400 | 3000 | 2700 | 2700 | 2700 |
| Molecular weight distribution |  | 4.4 | 3.0 | 3.0 | 2.9 | 2.9 |
| Viscosity |  | IJ | XY | -Z2 | Z5 | TU |

TABLE 2-continued

|  |  |  |  |  |  |
|---|---|---|---|---|---|
| Solid content (wt %) | | 60.1 | 56.3 | 56.1 | 56.2 | 56.1 |
| Evaluation | Hardness of coating film (N/mm²) | 7.5 | 8.8 | 7.4 | 6.2 | 5.6 |

TABLE 3

|  |  | Example 12 | Example 13 | Example 14 | Example 15 | Example 16 | Example 17 |
|---|---|---|---|---|---|---|---|
| Resin composition | | A-16 | A-17 | A-18 | A-19 | A-20 | A-21 |
| Monomer to be charged (parts) | Macromonomer 1 (Mn of 3000) | 0 | 0 | 0 | 0 | 0 | 0 |
| | Macromonomer 2 (Mn of 2000) | 0 | 0 | 0 | 0 | 0 | 0 |
| | Macromonomer 3 (Mn of 1600) | 8 | 8 | 8 | 8 | 8 | 8 |
| | AA-6 | 0 | 0 | 0 | 0 | 0 | 0 |
| Composition of mixture (parts) | MMA | 4.4 | 0 | 0 | 0 | 0 | 0 |
| | EA | 57.9 | 36 | 56 | 66 | 57.9 | 57.9 |
| | CIIMA | 0 | 0 | 0 | 0 | 0 | 0 |
| | BA | 0 | 0 | 0 | 0 | 0 | 0 |
| | MTA | 0 | 0 | 0 | 0 | 0 | 0 |
| | MM-Zn1 (metal-containing monomer pure content) | 9.7 | 16 | 16 | 16 | 14.1 | 14.1 |
| | MM-Zn2 (metal-containing monomer pure content) | 0 | 0 | 0 | 0 | 0 | 0 |
| | IBEMA | 0 | 0 | 0 | 0 | 0 | 0 |
| | TIPX | 0 | 0 | 0 | 0 | 0 | 0 |
| | FM-0711 | 0 | 0 | 0 | 0 | 0 | 0 |
| | X-24-8201 | 20 | 40 | 20 | 10 | 20 | 20 |
| | FM-7721 | 0 | 0 | 0 | 0 | 0 | 0 |
| | AIBN | 0.5 | 0.5 | 0.5 | 0.5 | 1 | 1 |
| | AMBN | 0.7 | 0.7 | 0.7 | 0.7 | 2 | 5 |
| | NOFMER MSD | 1.2 | 1.2 | 1.2 | 1.2 | 1.2 | 1.2 |
| Compound (Y) | Isobutyl vinyl ether | — | — | — | — | — | — |
| Weight-average molecular weight (Mw) | | 7900 | 7100 | 6400 | 6400 | 7800 | 5800 |
| Number-average molecular weight (Mn) | | 2700 | 2700 | 2600 | 2600 | 5800 | 2300 |
| Molecular weight distribution | | 2.9 | 2.6 | 2.5 | 2.5 | 1.3 | 2.5 |
| Viscosity | | -Z1 | JK | G | E | I | AB |
| Solid content (wt %) | | 55.1 | 57.4 | 53.1 | 52.1 | 56 | 56 |
| Evaluation | Hardness of coating film (N/mm²) | 8.6 | 16 | 13.2 | 11.1 | 4 | 3.2 |

|  |  | Example 18 | Example 19 | Example 20 | Example 21 | Example 22 |
|---|---|---|---|---|---|---|
| Resin composition | | A-22 | A-23 | A-24 | A-25 | A-26 |
| Monomer to be charged (parts) | Macromonomer 1 (Mn of 3000) | 0 | 0 | 0 | 0 | 0 |
| | Macromonomer 2 (Mn of 2000) | 0 | 0 | 0 | 0 | 0 |
| | Macromonomer 3 (Mn of 1600) | 13 | 13 | 13 | 8 | 0.3 |
| | AA-6 | 0 | 0 | 0 | 0 | 0 |
| Composition of mixture (parts) | MMA | 0 | 0 | 0 | 0 | 9.4 |
| | EA | 32.9 | 32.9 | 32.9 | 22.9 | 57.9 |
| | CIIMA | 0 | 0 | 0 | 0 | 0 |
| | BA | 0 | 0 | 0 | 0 | 0 |
| | MTA | 0 | 0 | 0 | 0 | 0 |
| | MM-Zn1 (metal-containing monomer pure content) | 14.1 | 14.1 | 14.1 | 14.1 | 9.7 |
| | MM-Zn2 (metal-containing monomer pure content) | 0 | 0 | 0 | 0 | 0 |
| | IBEMA | 0 | 0 | 0 | 0 | 0 |
| | TIPX | 0 | 0 | 0 | 0 | 0 |
| | FM-0711 | 40 | 40 | 40 | 55 | 0 |
| | X-24-8201 | 0 | 0 | 0 | 0 | 20 |
| | FM-7721 | 0 | 0 | 0 | 0 | 0 |
| | AIBN | 1 | 1 | 1 | 0.5 | 0.5 |
| | AMBN | 2 | 3.5 | 5 | 0.7 | 0.7 |
| | NOFMER MSD | 1.2 | 1.2 | 1.2 | 1.2 | 1.2 |
| Compound (Y) | Isobutyl vinyl ether | — | — | — | — | — |
| Weight-average molecular weight (Mw) | | 7770 | 6800 | 5800 | 9700 | 8200 |
| Number-average molecular weight (Mn) | | 2690 | 2500 | 2300 | 3200 | 2800 |
| Molecular weight distribution | | 2.9 | 2.7 | 2.5 | 3.0 | 2.9 |

TABLE 3-continued

|  |  |  |  |  |  |  |
|---|---|---|---|---|---|---|
| Viscosity | | HI | CD | +B | ST | G |
| Solid content (wt %) | | 55.9 | 55.7 | 55.7 | 56.3 | 53 |
| Evaluation | Hardness of coating film (N/mm²) | 6.6 | 5.4 | 4.9 | 9.2 | 7 |

TABLE 4

| | | Example 23 | Example 24 | Example 25 | Example 26 | Example 27 | Example 28 | Example 29 | Example 30 |
|---|---|---|---|---|---|---|---|---|---|
| Resin composition | | A-27 | A-28 | A-29 | A-30 | A-31 | A-32 | A-33 | A-34 |
| Monomer to be charged (parts) | Macromonomer 1 (Mn of 3000) | 0 | 0 | 0 | 0 | 0 | 0 | 0 | 0 |
| | Macromonomer 2 (Mn of 2000) | 0 | 0 | 0 | 0 | 10 | 20 | 0 | 0 |
| | Macromonomer 3 (Mn of 1600) | 13 | 13 | 13 | 13 | 0 | 0 | 10 | 20 |
| | AA-6 | 0 | 0 | 0 | 0 | 0 | 0 | 0 | 0 |
| Composition of mixture (parts) | MMA | 0 | 0 | 0 | 0 | 0 | 0 | 15 | 15 |
| | EA | 34.2 | 29.2 | 29.2 | 29.2 | 45 | 15 | 30 | 0 |
| | CHMA | 0 | 5 | 0 | 0 | 0 | 0 | 0 | 0 |
| | BA | 0 | 0 | 5 | 0 | 0 | 0 | 0 | 0 |
| | MTA | 0 | 0 | 0 | 5 | 0 | 0 | 0 | 0 |
| | MM-Zn1 (metal-containing monomer pure content) | 12.8 | 12.8 | 12.8 | 12.8 | 0 | 0 | 0 | 0 |
| | MM-Zn2 (metal-containing monomer pure content) | 0 | 0 | 0 | 0 | 0 | 0 | 0 | 0 |
| | IBEMA | 0 | 0 | 0 | 0 | 25 | 25 | 0 | 0 |
| | TIPX | 0 | 0 | 0 | 0 | 0 | 0 | 25 | 25 |
| | FM-0711 | 40 | 40 | 40 | 40 | 20 | 40 | 0 | 0 |
| | X-24-8201 | 0 | 0 | 0 | 0 | 0 | 0 | 20 | 40 |
| | FM-7721 | 0 | 0 | 0 | 0 | 0 | 0 | 0 | 0 |
| | AIBN | 1 | 1 | 1 | 1 | 0 | 0 | 0 | 0 |
| | AMBN | 2 | 2 | 2 | 2 | 0.5 | 0.5 | 0.7 | 0.7 |
| | NOFMER MSD | 1.2 | 1.2 | 1.2 | 1.2 | — | — | — | — |
| Compound Y | Isobutyl vinyl ether | — | — | — | — | 6.7 | 6.7 | — | — |
| Weight-average molecular weight (Mw) | | 8600 | 8600 | 8500 | 8600 | 13000 | 15000 | 29000 | 30000 |
| Number-average molecular weight (Mn) | | 2900 | 2900 | 2800 | 2700 | 7300 | 7300 | 6400 | 6700 |
| Molecular weight distribution | | 3.0 | 3.0 | 3.0 | 3.2 | 1.8 | 2.1 | 4.5 | 4.5 |
| Viscosity | | N | HI | OP | +P | IJ | DE | +K | −F |
| Solid content (wt %) | | 55.1 | 55.6 | 55.9 | 56.1 | 61 | 60.5 | 60.8 | 60.4 |
| Evaluation | Hardness of coating film (N/mm²) | 7 | 4.7 | 4.9 | 5.5 | 7.1 | 10.1 | 7.2 | 8.9 |

| | | Example 31 | Example 32 | Comparative Example 1 | Comparative Example 2 | Comparative Example 3 | Comparative Example 4 |
|---|---|---|---|---|---|---|---|
| Resin composition | | A-35 | A-36 | A-8 | A-9 | A-10 | A-11 |
| Monomer to be charged (parts) | Macromonomer 1 (Mn of 3000) | 0 | 0 | 0 | 0 | 0 | 0 |
| | Macromonomer 2 (Mn of 2000) | 0 | 0 | 0 | 0 | 0 | 0 |
| | Macromonomer 3 (Mn of 1600) | 0 | 8 | 0 | 0 | 0 | 0 |
| | AA-6 | 8 | 0 | 0 | 0 | 0 | 0 |
| Composition of mixture (parts) | MMA | 0 | 0 | 32.3 | 18 | 35 | 55 |
| | EA | 37.9 | 12.9 | 38 | 25 | 20 | 0 |
| | CHMA | 0 | 0 | 0 | 0 | 0 | 0 |
| | BA | 0 | 0 | 0 | 0 | 0 | 0 |
| | MTA | 0 | 0 | 0 | 0 | 0 | 0 |
| | MM-Zn1 (metal-containing monomer pure content) | 14.1 | 14.1 | 9.7 | 0 | 0 | 0 |
| | MM-Zn2 (metal-containing monomer pure content) | 0 | 0 | 0 | 16.9 | 0 | 0 |
| | IBEMA | 0 | 0 | 0 | 0 | 25 | 0 |
| | TIPX | 0 | 0 | 0 | 0 | 0 | 25 |
| | FM-0711 | 40 | 65 | 20 | 0 | 20 | 0 |
| | X-24-8201 | 0 | 0 | 0 | 40 | 0 | 20 |
| | FM-7721 | 0 | 0 | 0 | 0 | 0 | 0 |
| | AIBN | 1 | 0.5 | 2.5 | 2.5 | 0 | 0 |
| | AMBN | 2.5 | 0.7 | 3 | 1 | 1.6 | 0.7 |
| | NOFMER MSD | 1.2 | 1.2 | 1.2 | 0 | — | — |

TABLE 4-continued

| Compound (Y) | Isobutyl vinyl ether | — | — | — | — | 6.7 | — |
|---|---|---|---|---|---|---|---|
| Weight-average molecular weight (Mw) | | 11000 | 11000 | 7600 | 8200 | 17000 | 30000 |
| Number-average molecular weight (Mn) | | 3200 | 3400 | 2900 | 3000 | 7200 | 8100 |
| Molecular weight distribution | | 3.4 | 3.2 | 2.6 | 2.7 | 2.4 | 3.7 |
| Viscosity | | +I | P | +V | +U | E | HI |
| Solid content (wt %) | | 51 | 56.3 | 45.4 | 45.2 | 51 | 51.1 |
| Evaluation | Hardness of coating film (N/mm$^2$) | 12.1 | 7.7 | 5.1 | 6.4 | 6.9 | 6.8 |

In Tables 2 to 4, the abbreviations shown in the columns of the monomer to be charged and the composition of the mixture indicate the following materials. Further, the numerical value listed in each column indicates the amount (parts) of each material to be charged.

Macromonomers 1 and 2: macromonomers 1 and 2 respectively obtained in Production Examples 5 and 6
MMA: methyl methacrylate
EA: ethyl acrylate
MM-Zn1: metal atom-containing polymer monomer mixture (MM-Zn1) obtained in Production Example 1
MM-Zn2: metal atom-containing polymer monomer mixture (MM-Zn2) obtained in Production Example 2
IBEMA: synthetic product obtained in Production Example 7, 1-isobutoxyethyl methacrylate
FM-0711: trade name, manufactured by JNC Corporation (one terminal type polysiloxane block-containing polymerizable monomer in which v in Formula (1) represents 0, $R^{3a}$ to $R^{3f}$ represent a methyl group, w represents 3, and x represents 10)
X-24-8201: trade name, manufactured by Shin-Etsu Chemical Co., Ltd. (one terminal type polysiloxane block-containing polymerizable monomer in which v in Formula (1) represents 0, $R^{3a}$ to $R^{3f}$ represent a methyl group, w represents 3, and x represents 25)
FM-7721: trade name, manufactured by JNC Corporation (both terminal type polysiloxane block-containing polymerizable monomer in which v in Formula (b4) represents 0, $R^{3a}$ to $R^{3f}$ represent a methyl group, w represents 3, and x represents 65)
AIBN: 2,2'-azobis(isobutyronitrile)
AMBN: 2,2'-azobis(2-methylbutyronitrile)
NOFMER MSD: trade name, manufactured by NOF Corporation, α-methylstyrene dimer
CHMA: cyclohexyl methacrylate
BA: butyl acrylate
MTA: 2-methoxyethyl acrylate
AA-6: manufactured by Toagosei Co., Ltd., MMA macromonomer (number-average molecular weight of 6000)

Examples 33 to 71 and Comparative Examples 5 to 8

Respective components were mixed using a high speed disperser based on the formulations listed in Tables 5 to 8 to obtain each antifouling paint composition. The antifouling properties and the consumption degree were evaluated using the obtained antifouling paint compositions. The results thereof are listed in Tables 5 to 8.

TABLE 5

| | | Example 33 | Example 34 | Example 35 | Example 36 | Example 37 | Example 38 | Example 39 | Comparative Example 5 | Comparative Example 6 |
|---|---|---|---|---|---|---|---|---|---|---|
| Resin composition | A-1 | 100 | — | — | — | — | — | — | — | — |
| | A-2 | — | 100 | — | — | — | — | — | — | — |
| | A-3 | — | — | 100 | — | — | — | — | — | — |
| | A-4 | — | — | — | 100 | — | — | — | — | — |
| | A-5 | — | — | — | — | 100 | — | — | — | — |
| | A-6 | — | — | — | — | — | 100 | — | — | — |
| | A-7 | — | — | — | — | — | — | 100 | — | — |
| | A-8 | — | — | — | — | — | — | — | 100 | — |
| | A-9 | — | — | — | — | — | — | — | — | 100 |
| Total | | 100 | 100 | 100 | 100 | 100 | 100 | 100 | 100 | 100 |
| Evaluation | Consumption degree (μm/M) | 3.7 | 5.2 | 4.7 | 4.8 | 6.5 | 4.6 | 4.2 | 10.2 | 18.4 |
| | Antifouling property | B | B | B | B | B | B | B | B | B |

TABLE 6

| | | Comparative Example 7 | Comparative Example 8 | Example 40 | Example 41 | Example 42 | Example 43 | Example 44 | Example 45 | Example 46 |
|---|---|---|---|---|---|---|---|---|---|---|
| Resin composition | A-1 | — | — | 33 | 75 | — | — | — | — | — |
| | A-2 | — | — | — | — | 55 | — | — | — | 36 |
| | A-3 | — | — | — | — | — | — | 36 | — | — |
| | A-4 | — | — | — | — | — | — | — | — | — |
| | A-5 | — | — | — | — | — | 55 | — | — | — |
| | A-6 | — | — | — | — | — | — | — | 33 | — |
| | A-10 | 100 | — | — | — | — | — | — | — | — |
| | A-11 | — | 100 | — | — | — | — | — | — | — |

TABLE 6-continued

|  | Comparative Example 7 | Comparative Example 8 | Example 40 | Example 41 | Example 42 | Example 43 | Example 44 | Example 45 | Example 46 |
|---|---|---|---|---|---|---|---|---|---|
| Cuprous oxide | — | — | — | — | — | 3 | 45 | 45 | — |
| Pyrizine triphenyl borane | — | — | — | — | — | — | — | — | 15 |
| 4-Bromo-2-(4-chlorophenyl)-5-(trifluoromethyl)-1H-pyrrole-3-carbomtrile | — | — | — | — | 2 | — | — | — | — |
| Zinc pyrithione | — | — | — | — | 3 | — | — | — | — |
| Copper pyrithione | — | — | — | — | — | — | 3 | 3 | — |
| 4,5-Dichloro-2-n-octyl-isothiazoline-3-one | — | — | — | — | — | — | — | — | 4 |
| Titanium oxide | — | — | 15 | — | 2 | 2 | — | — | — |
| Silicone oil: KF6016 | — | — | — | 8 | — | — | 4 | 4 | — |
| TOYOPARAX 150 | — | — | — | — | 4 | — | — | — | — |
| Molecular sieve | — | — | — | — | — | — | — | 1 | — |
| Powdery silica | — | — | 3 | — | — | — | — | — | — |
| DISPARLON 4200-20 | — | — | 2 | — | 2 | 2 | 2 | 2 | 2 |
| DISPARLON A603-20X | — | — | 2 | — | 2 | 2 | 2 | 2 | 2 |
| Xylene | — | — | 5 | — | 10 | 10 | 10 | 9 | 5 |
| Total | 100 | 100 | 60 | 83 | 80 | 74 | 102 | 99 | 64 |
| Evaluation Consumption degree (μm/M) | 8.3 | 7.2 | 2.6 | 3.8 | 3.8 | 5.1 | 1.6 | 1.8 | 2.4 |
| Antifouling property | B | B | B | B | B | B | B | B | B |

TABLE 7

|  |  | Example 47 | Example 48 | Example 49 | Example 50 | Example 51 | Example 52 |
|---|---|---|---|---|---|---|---|
| Resin composition | A-12 | 100 | — | — | — | — | — |
|  | A-13 | — | 100 | — | — | — | — |
|  | A-14 | — | — | 100 | — | — | — |
|  | A-15 | — | — | — | 100 | — | — |
|  | A-16 | — | — | — | — | 100 | — |
|  | A-17 | — | — | — | — | — | 100 |
|  | A-18 | — | — | — | — | — | — |
|  | A-19 | — | — | — | — | — | — |
|  | A-20 | — | — | — | — | — | — |
|  | A-21 | — | — | — | — | — | — |
|  | A-22 | — | — | — | — | — | — |
|  | A-23 | — | — | — | — | — | — |
|  | A-24 | — | — | — | — | — | — |
|  | A-25 | — | — | — | — | — | — |
|  | A-26 | — | — | — | — | — | — |
|  | A-27 | — | — | — | — | — | — |
|  | A-28 | — | — | — | — | — | — |
|  | A-29 | — | — | — | — | — | — |
|  | A-30 | — | — | — | — | — | — |
|  | A-31 | — | — | — | — | — | — |
|  | A-32 | — | — | — | — | — | — |
|  | A-33 | — | — | — | — | — | — |
|  | A-34 | — | — | — | — | — | — |
|  | A-35 | — | — | — | — | — | — |
|  | A-36 | — | — | — | — | — | — |
| Total |  | 100 | 100 | 100 | 100 | 100 | 100 |
| Evaluation | Consumption degree (μm/M) | 8.2 | 16.1 | 29.1 | 8.7 | 8.2 | 7.4 |
|  | Antifouling property | B | B | B | B | B | B |

|  |  | Example 53 | Example 54 | Example 55 | Example 56 | Example 57 | Example 58 |
|---|---|---|---|---|---|---|---|
| Resin composition | A-12 | — | — | — | — | — | — |
|  | A-13 | — | — | — | — | — | — |
|  | A-14 | — | — | — | — | — | — |
|  | A-15 | — | — | — | — | — | — |
|  | A-16 | — | — | — | — | — | — |
|  | A-17 | — | — | — | — | — | — |
|  | A-18 | 100 | — | — | — | — | — |
|  | A-19 | — | 100 | — | — | — | — |
|  | A-20 | — | — | 100 | — | — | — |
|  | A-21 | — | — | — | 100 | — | — |
|  | A-22 | — | — | — | — | 100 | — |
|  | A-23 | — | — | — | — | — | 100 |

TABLE 7-continued

| | | | | | | | |
|---|---|---|---|---|---|---|---|
| | A-24 | — | — | — | — | — | — |
| | A-25 | — | — | — | — | — | — |
| | A-26 | — | — | — | — | — | — |
| | A-27 | — | — | — | — | — | — |
| | A-28 | — | — | — | — | — | — |
| | A-29 | — | — | — | — | — | — |
| | A-30 | — | — | — | — | — | — |
| | A-31 | — | — | — | — | — | — |
| | A-32 | — | — | — | — | — | — |
| | A-33 | — | — | — | — | — | — |
| | A-34 | — | — | — | — | — | — |
| | A-35 | — | — | — | — | — | — |
| | A-36 | — | — | — | — | — | — |
| Total | | 100 | 100 | 100 | 100 | 100 | 100 |
| Evaluation | Consumption degree (μm/M) | 21.2 | 31 | 27 | 58 | 8.2 | 17.2 |
| | Antifouling property | B | B | A | A | B | B |

TABLE 8

| | | Example 59 | Example 60 | Example 61 | Example 62 | Example 63 | Example 64 | Example 65 |
|---|---|---|---|---|---|---|---|---|
| Resin composition | A-12 | — | — | — | — | — | — | — |
| | A-13 | — | — | — | — | — | — | — |
| | A-14 | — | — | — | — | — | — | — |
| | A-15 | — | — | — | — | — | — | — |
| | A-16 | — | — | — | — | — | — | — |
| | A-17 | — | — | — | — | — | — | — |
| | A-18 | — | — | — | — | — | — | — |
| | A-19 | — | — | — | — | — | — | — |
| | A-20 | — | — | — | — | — | — | — |
| | A-21 | — | — | — | — | — | — | — |
| | A-22 | — | — | — | — | — | — | — |
| | A-23 | — | — | — | — | — | — | — |
| | A-24 | 100 | — | — | — | — | — | — |
| | A-25 | — | 100 | — | — | — | — | — |
| | A-26 | — | — | 100 | — | — | — | — |
| | A-27 | — | — | — | 100 | — | — | — |
| | A-28 | — | — | — | — | 100 | — | — |
| | A-29 | — | — | — | — | — | 100 | — |
| | A-30 | — | — | — | — | — | — | 100 |
| | A-31 | — | — | — | — | — | — | — |
| | A-32 | — | — | — | — | — | — | — |
| | A-33 | — | — | — | — | — | — | — |
| | A-34 | — | — | — | — | — | — | — |
| | A-35 | — | — | — | — | — | — | — |
| | A-36 | — | — | — | — | — | — | — |
| Total | | 100 | 100 | 100 | 100 | 100 | 100 | 100 |
| Evaluation | Consumption degree (μm/M) | 26.8 | 2.8 | 10.2 | 7 | 5.1 | 6.8 | 7.5 |
| | Antifouling property | A | B | B | B | B | B | B |

| | | | Example 66 | Example 67 | Example 68 | Example 69 | Example 70 | Example 71 |
|---|---|---|---|---|---|---|---|---|
| Resin composition | | A-12 | — | — | — | — | — | — |
| | | A-13 | — | — | — | — | — | — |
| | | A-14 | — | — | — | — | — | — |
| | | A-15 | — | — | — | — | — | — |
| | | A-16 | — | — | — | — | — | — |
| | | A-17 | — | — | — | — | — | — |
| | | A-18 | — | — | — | — | — | — |
| | | A-19 | — | — | — | — | — | — |
| | | A-20 | — | — | — | — | — | — |
| | | A-21 | — | — | — | — | — | — |
| | | A-22 | — | — | — | — | — | — |
| | | A-23 | — | — | — | — | — | — |
| | | A-24 | — | — | — | — | — | — |
| | | A-25 | — | — | — | — | — | — |
| | | A-26 | — | — | — | — | — | — |
| | | A-27 | — | — | — | — | — | — |
| | | A-28 | — | — | — | — | — | — |
| | | A-29 | — | — | — | — | — | — |
| | | A-30 | — | — | — | — | — | — |

TABLE 8-continued

|  |  |  |  |  |  |  |  |
|---|---|---|---|---|---|---|---|
| | A-31 | 100 | — | — | — | — | — |
| | A-32 | — | 100 | — | — | — | — |
| | A-33 | — | — | 100 | — | — | — |
| | A-34 | — | — | — | 100 | — | — |
| | A-35 | — | — | — | — | 100 | — |
| | A-36 | — | — | — | — | — | 100 |
| Total | | 100 | 100 | 100 | 100 | 100 | 100 |
| Evaluation | Consumption degree (μm/M) | 5.1 | 3.0 | 4.8 | 3.6 | 2.4 | 1.5 |
| | Antifouling property | B | B | B | B | C | C |

In Tables 5 to 8, the abbreviations indicate the following materials. Further, the numerical value listed in each column indicates the amount (parts) of each material to be charged. The amount of each of the resin compositions A-1 to A-11 to be charged indicates the total mass of each resin composition.

KF-6016: trade name, manufactured by Shin-Etsu Chemical Co., Ltd., polyether-modified silicon oil TOYOPARAX (registered trademark) 150: manufactured by Tosoh corporation, chlorinated paraffin DISPARLON (registered trademark) 4200-20: manufactured by Kusumoto Chemicals, Ltd., oxidized polyethylene wax DISPARLON A603-20X: manufactured by Kusumoto Chemicals, Ltd., polyamide wax Each resin composition of Examples 1 to 32 had a high solid content and a low viscosity. Further, it was confirmed that the hardness of the coating film was sufficiently high.

Since the resin compositions of Comparative Examples 1 and 2 which had the constituent unit (A3) did not have a combination of macromonomers, the resin compositions had a high viscosity even though the solid contents were lower than those of Examples 1 to 5. Further, the hardness of each coating film was degraded.

Similarly, since the resin composition of Comparative Example 3 which had the constituent unit (A1) and the resin composition of Comparative Example 4 which had the constituent unit (A2) had a high viscosity even though the solid contents were respectively lower than those of Examples 6 and 7. Further, the hardness of each coating film was degraded.

All coating films of the antifouling paint compositions of Examples 33 to 71, obtained by using the resin compositions of Examples 1 to 32, exhibited excellent consumption degrees and antifouling properties.

The invention claimed is:

1. A resin composition, comprising:
a (meth)acrylic copolymer:
an organic solvent,
wherein the (meth)acrylic copolymer is present in the resin composition in an amount of at least 45 mass %, relative to a total resin composition mass,
wherein the organic solvent is present in the resin composition in an amount of at least 15 mass %, relative to the total resin composition mass,
wherein the (meth)acrylic copolymer comprises
a constituent unit (A) comprising a constituent unit (A1) comprising a structure (I) of formula (1), formula (2), or formula (3), a constituent unit (A2) comprising a triorganosilyloxycarbonyl group, and/or a constituent unit (A3) comprising a structure (III) of formula (4) or formula (5),
a constituent unit (B) derived from at least one polysiloxane block-containing polymerizable monomer (b) comprising a polymerizable monomer of formula (b1), a polymerizable monomer of formula (b2), a polymerizable monomer of formula (b3), and/or a polymerizable monomer of formula (b4), and
a constituent unit (C) derived from a macromonomer (c) comprising two or more constituent units of formula (c')

(1)

(2)

(3)

—COO-M-OCO— (4)

—COO-M-$R^{22}$ (5)

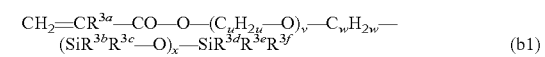

(b1)

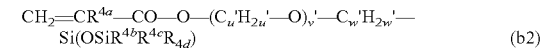

(b2)

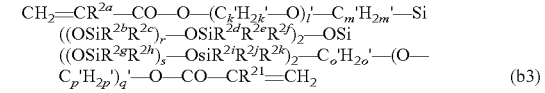

(b3)

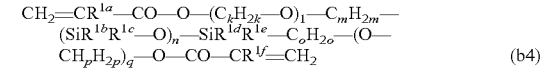

(b4)

(c')

wherein, in formula (1) to (5), (1) to (b4), and (c'),
X is —O—, —S—, or —$NR^{14}$—, —$R^{14}$ being H or an alkyl group, R¹ and R² are independently or an alkyl group comprising 1 to 10 carbon atoms, R³ and R⁵ are independently an alkyl group comprising 1 to 20 carbon atoms, a cycloalkyl group, or an aryl group, R⁴ and R⁶ are independently an alkylene group comprising 1 to 10 carbon atoms, M is Zn, Cu, Mg, or Ca, R²² is a monovalent organic acid residue, $R^{1a}$, $R^{1f}$, $R^{2a}$, $R^{3a}$, $R^{4a}$, and $R^{21}$, are independently H or a methyl group, $R^{1b}$ to $R^{1e}$ and $R^{3b}$ to $R^{3f}$ are independently an alkyl group, an alkoxy group, a phenyl group, a substituted phenyl group, a phenoxy group, or a substituted phenoxy group, $R^{4b}$ to $R^{4d}$ are independently an alkyl group, $-(OSiR^{51}R^{52})_y-OSiR^{53}R^{54}R^{55}$ with y being an integer in a range of from 0 to 20, and $R^{51}$ to $R^{55}$ represent being an alkyl group), $-R^{56}-(OC_2H_4)_{y'}-OR^{57}$ with y' being an integer in a range of 1 to 20, $R^{56}$ being an alkylene group, and $R^{57}$ being an alkyl group, $R^{2b}$ to $R^{2k}$ are independently an alkyl group, r and s are independently a number in a range of from 0 to 20, l, l', q, q', v, and v' are independently a number in a range of from 0 to 50, k, k', in, m', o, o', p, p', u, u', w, and w' are independently an integer in a range of from 2 to 5, n and x are independently a number in a range of from 3 to 80, $R^{41}$ is H, a methyl group, or $CH_2OH$ $R^{42}$ is $OR^{43}$, a halogen atom, $COR^{44}$, $COOR^{45}$, CN, $CONR^{46}R^{47}$, or $R^{48}$, $R^{43}$ to $R^{47}$ are independently H or an optionally substituted alkyl, alicyclic, aryl, heteroaryl, non-aromatic heterocyclic, aralkyl, alkaryl, or organosilyl group, and $R^{48}$ is an optionally substituted aryl or heteroaryl group.

2. The resin composition of claim 1, wherein a number-average molecular weight of the macromonomer (c) is in a range of from 500 to 50000.

3. The resin composition of claim 1, further comprising: silicone oil.

4. The resin composition of claim 1, wherein the (meth)acrylic copolymer has the constituent unit (A1), and wherein the resin composition further comprises a compound (Y) comprising a compound of formula (31), a compound of formula (32), and/or a compound of formula (33)

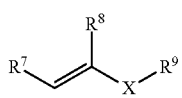
(31)

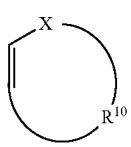
(32)

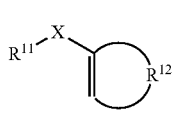
(33)

wherein, in formula (31) to (33),

X is —O—, —S—, or —NR¹⁴—, $R^{14}$ is H or an alkyl group, $R^7$ is H or an alkyl group comprising 1 to 9 carbon atoms, $R^8$ is H or an alkyl group comprising 1 to 10 carbon atoms, $R^9$ and $R^{11}$ are independently an alkyl group comprising 1 to 20 carbon atoms, a cycloalkyl group, or an aryl group, $R^{10}$ is a single bond or an alkylene group comprising 1 to 9 carbon atoms, and $R^{12}$ is an alkylene group comprising 1 to 9 carbon atoms.

5. An antifouling paint composition, comprising:
the composition of claim 1.

6. The antifouling paint composition of claim 5, further comprising:
an antifouling agent.

7. The antifouling paint composition of claim 5, further comprising:
a thermoplastic resin other than the (meth)acrylic copolymer.

8. A method for producing the resin composition of claim 1, the method comprising:
polymerizing a monomer mixture comprising the polymerizable monomer (a), the polysiloxane block-containing polymerizable monomer (b), and the macromonomer (c), to obtain the (meth)acrylic copolymer.

9. The resin composition of claim 1, comprising, in the constituent unit (A), the constituent unit (A1).

10. The resin composition of claim 1, wherein the constituent unit (A1) is present and comprises the structure (I) of formula (I).

11. The resin composition of claim 1, wherein the constituent unit (A1) is present and comprises the structure (I) of formula (2).

12. The resin composition of claim 1, wherein the constituent unit (A1) is present and comprises the structure (I) of formula (3).

13. The resin composition of claim 1, wherein the constituent unit (A) is present in the copolymer (X) in a range of from 5 to 50 mass %.

14. The resin composition of claim 1, wherein the constituent unit (A) is present in the copolymer (X) in a range of from 10 to 40 mass %.

15. The resin composition of claim 1, wherein the constituent unit (C) is present in the copolymer (X) in a range of from 2 to 70 mass %.

16. The resin composition of claim 1, wherein the copolymer (X) has a number-average molecular weight in a range of from 1000 to 40000.

17. The resin composition of claim 1, wherein the copolymer (X) has a molecular weight distribution (Mw/Mn) in a range of from 1.5 to 5.0.

18. The resin composition of claim 1, wherein the copolymer (X) has a molecular weight distribution (Mw/Mn) in a range of from 2.2 to 3.0.

19. The resin composition of claim 1, wherein the (meth)acrylic copolymer is present in the resin composition in an amount of at least 50 mass %, relative to a total resin composition mass.

20. The resin composition of claim 1, wherein the (meth)acrylic copolymer is present in the resin composition in an amount of at least 55 mass %, relative to a total resin composition mass.

21. The resin composition of claim 1, wherein the organic solvent is toluene, xylene, methyl isobutyl ketone, and/or n-butyl acetate

22. The resin composition of claim 1, wherein the organic solvent as propylene glycol monomethyl ether-2-acetate, methyl isobutyl ketone, and/or Compound (Y).

23. The resin composition of claim 22, wherein the organic solvent is isobutyl vinyl ether.

* * * * *